United States Patent
Grubb et al.

(10) Patent No.: US 9,784,037 B2
(45) Date of Patent: *Oct. 10, 2017

(54) ELECTRIC MOTOR FOR LASER-MECHANICAL DRILLING

(71) Applicants: Daryl L. Grubb, Houston, TX (US); Brian O. Faircloth, Evergreen, CO (US); Mark S. Zediker, Caste Rock, CO (US)

(72) Inventors: Daryl L. Grubb, Houston, TX (US); Brian O. Faircloth, Evergreen, CO (US); Mark S. Zediker, Caste Rock, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,382

(22) Filed: Jun. 22, 2015

(65) Prior Publication Data
US 2016/0186497 A1 Jun. 30, 2016

Related U.S. Application Data

(63) Continuation of application No. 13/403,287, filed on Feb. 23, 2012, now Pat. No. 9,074,422, which is a
(Continued)

(51) Int. Cl.
*E21B 7/15* (2006.01)
*B23K 26/00* (2014.01)
(Continued)

(52) U.S. Cl.
CPC ............ *E21B 7/15* (2013.01); *B23K 26/0093* (2013.01); *B23K 26/0648* (2013.01);
(Continued)

(58) Field of Classification Search
CPC ........ E21B 4/04; E21B 7/15; E21B 2023/008; B23K 26/0093; B23K 26/0684; B23K 26/1464; B23K 26/38
See application file for complete search history.

(56) References Cited

U.S. PATENT DOCUMENTS 914,636 A   3/1909   Case
2,548,463 A 4/1951   Blood
(Continued)

FOREIGN PATENT DOCUMENTS

EP   0 295 045 A2   12/1988
EP   0 515 983 A1   12/1992
(Continued)

OTHER PUBLICATIONS

U.S. Appl. No. 12/543,986, filed Aug. 19, 2009, Moxley et al.
(Continued)

*Primary Examiner* — Jennifer H Gay
(74) *Attorney, Agent, or Firm* — Glen P. Belvis; Belvis Law, LLC.

(57) ABSTRACT

A high power laser drilling system utilizing an electric motor laser bottom hole assembly. A high power laser beam travels within the electric motor for performing a laser operation. A system includes a down hole electrical motor having a hollow rotor for conveying a high power laser beam having a wavelength less than 1060 nm through the electrical motor.

10 Claims, 6 Drawing Sheets

Related U.S. Application Data continuation-in-part of application No. 13/210,581, filed on Aug. 16, 2011, now Pat. No. 8,662,160.

(60) Provisional application No. 61/446,042, filed on Feb. 24, 2011, provisional application No. 61/446,043, filed on Feb. 24, 2011, provisional application No. 61/446,040, filed on Feb. 24, 2011, provisional application No. 61/446,312, filed on Feb. 24, 2011.

(51) Int. Cl.

| | | |
|---|---|---|
| *B23K 26/06* | (2014.01) | |
| *B23K 26/10* | (2006.01) | |
| *B23K 26/14* | (2014.01) | |
| *B23K 26/38* | (2014.01) | |
| *E21B 7/14* | (2006.01) | |
| *E21B 4/04* | (2006.01) | |
| *E21B 23/00* | (2006.01) | |
| *B23K 103/00* | (2006.01) | |

(52) U.S. Cl.
CPC .......... *B23K 26/10* (2013.01); *B23K 26/1464* (2013.01); *B23K 26/38* (2013.01); *E21B 4/04* (2013.01); *E21B 7/14* (2013.01); *B23K 2203/30* (2015.10); *B23K 2203/50* (2015.10); *E21B 2023/008* (2013.01)

(56) References Cited

U.S. PATENT DOCUMENTS

| | | | |
|---|---|---|---|
| 2,742,555 A | 4/1956 | Murray | |
| 3,122,212 A | 2/1964 | Karlovitz | |
| 3,383,491 A | 5/1968 | Muncheryan | |
| 3,461,964 A | 8/1969 | Venghiattis | |
| 3,493,060 A | 2/1970 | Van Dyk | |
| 3,503,804 A | 3/1970 | Schneider et al. | |
| 3,539,221 A | 11/1970 | Gladstone | |
| 3,544,165 A | 12/1970 | Snedden | |
| 3,556,600 A | 1/1971 | Shoupp et al. | |
| 3,574,357 A | 4/1971 | Alexandru et al. | |
| 3,586,413 A | 6/1971 | Adams | |
| 3,652,447 A | 3/1972 | Yant | |
| 3,693,718 A | 9/1972 | Stout | |
| 3,699,649 A | 10/1972 | McWilliams | |
| 3,802,203 A | 4/1974 | Ichise et al. | |
| 3,820,605 A | 6/1974 | Barber et al. | |
| 3,821,510 A | 6/1974 | Muncheryan | |
| 3,823,788 A | 7/1974 | Garrison et al. | |
| 3,871,485 A | 3/1975 | Keenan, Jr. | |
| 3,882,945 A | 5/1975 | Keenan, Jr. | |
| 3,938,599 A | 2/1976 | Horn | |
| 3,960,448 A | 6/1976 | Schmidt et al. | |
| 3,977,478 A | 8/1976 | Shuck | |
| 3,992,095 A | 11/1976 | Jacoby et al. | |
| 3,998,281 A | 12/1976 | Salisbury et al. | |
| 4,019,331 A | 4/1977 | Rom et al. | |
| 4,025,091 A | 5/1977 | Zeile, Jr. | |
| 4,026,356 A | 5/1977 | Shuck | |
| 4,046,191 A | 9/1977 | Neath | |
| 4,047,580 A | 9/1977 | Yahiro et al. | |
| 4,057,118 A | 11/1977 | Ford | |
| 4,061,190 A | 12/1977 | Bloomfield | |
| 4,066,138 A * | 1/1978 | Salisbury .................. | E21B 7/15 175/16 |
| 4,090,572 A * | 5/1978 | Welch ................ | B23K 26/1476 175/16 |
| 4,113,036 A * | 9/1978 | Stout ........................ | E21B 7/15 166/248 |
| 4,125,757 A | 11/1978 | Ross | |
| 4,151,393 A | 4/1979 | Fenneman et al. | |
| 4,162,400 A | 7/1979 | Pitts, Jr. | |
| 4,189,705 A | 2/1980 | Pitts, Jr. | |
| 4,194,536 A | 3/1980 | Stine et al. | |
| 4,199,034 A * | 4/1980 | Salisbury .................. | E21B 7/15 166/308.1 |
| 4,227,582 A * | 10/1980 | Price ........................ | E21B 7/15 166/297 |
| 4,228,856 A | 10/1980 | Reale | |
| 4,243,298 A | 1/1981 | Kao et al. | |
| 4,249,925 A | 2/1981 | Kawashima et al. | |
| 4,252,015 A | 2/1981 | Harbon et al. | |
| 4,256,146 A | 3/1981 | Genini et al. | |
| 4,266,609 A | 5/1981 | Rom et al. | |
| 4,280,535 A | 7/1981 | Willis | |
| 4,281,891 A | 8/1981 | Shinohara et al. | |
| 4,282,940 A | 8/1981 | Salisbury et al. | |
| 4,332,401 A | 6/1982 | Stephenson et al. | |
| 4,336,415 A | 6/1982 | Walling | |
| 4,340,245 A | 7/1982 | Stalder | |
| 4,367,917 A | 1/1983 | Gray | |
| 4,370,886 A | 2/1983 | Smith, Jr. et al. | |
| 4,374,530 A | 2/1983 | Walling | |
| 4,375,164 A | 3/1983 | Dodge et al. | |
| 4,389,645 A | 6/1983 | Wharton | |
| 4,415,184 A | 11/1983 | Stephenson et al. | |
| 4,417,603 A | 11/1983 | Argy | |
| 4,436,177 A | 3/1984 | Elliston | |
| 4,444,420 A | 4/1984 | McStravick et al. | |
| 4,453,570 A | 6/1984 | Hutchison | |
| 4,459,731 A | 7/1984 | Hutchison | |
| 4,477,106 A | 10/1984 | Hutchison | |
| 4,504,112 A | 3/1985 | Gould et al. | |
| 4,522,464 A | 6/1985 | Thompson et al. | |
| 4,531,552 A | 7/1985 | Kim | |
| 4,533,814 A | 8/1985 | Ward | |
| 4,565,351 A | 1/1986 | Conti et al. | |
| 4,662,437 A | 5/1987 | Renfro | |
| 4,690,212 A | 9/1987 | Termohlen | |
| 4,694,865 A | 9/1987 | Tauschmann | |
| 4,725,116 A | 2/1988 | Spencer et al. | |
| 4,741,405 A | 5/1988 | Moeny et al. | |
| 4,744,420 A | 5/1988 | Patterson et al. | |
| 4,770,493 A | 9/1988 | Ara et al. | |
| 4,793,383 A | 12/1988 | Gyory et al. | |
| 4,830,113 A | 5/1989 | Geyer | |
| 4,860,654 A | 8/1989 | Chawla et al. | |
| 4,860,655 A | 8/1989 | Chawla | |
| 4,872,520 A | 10/1989 | Nelson | |
| 4,924,870 A | 5/1990 | Wlodarczyk et al. | |
| 4,952,771 A | 8/1990 | Wrobel | |
| 4,989,236 A | 1/1991 | Myllymäki | |
| 4,997,250 A | 3/1991 | Ortiz, Jr. | |
| 5,003,144 A | 3/1991 | Lindroth et al. | |
| 5,004,166 A | 4/1991 | Sellar | |
| 5,033,545 A | 7/1991 | Sudol | |
| 5,049,738 A | 9/1991 | Gergely et al. | |
| 5,084,617 A | 1/1992 | Gergely | |
| 5,086,842 A | 2/1992 | Cholet | |
| 5,107,936 A | 4/1992 | Foppe | |
| 5,121,872 A | 6/1992 | Legget | |
| 5,125,061 A | 6/1992 | Marlier et al. | |
| 5,125,063 A | 6/1992 | Panuska et al. | |
| 5,128,882 A | 7/1992 | Cooper et al. | |
| 5,140,664 A | 8/1992 | Bosisio et al. | |
| 5,163,321 A | 11/1992 | Perales | |
| 5,168,940 A | 12/1992 | Foppe | |
| 5,172,112 A | 12/1992 | Jennings | |
| 5,212,755 A | 5/1993 | Holmberg | |
| 5,269,377 A | 12/1993 | Martin | |
| 5,285,204 A | 2/1994 | Sas-Jaworsky | |
| 5,348,097 A | 9/1994 | Giannesini et al. | |
| 5,351,533 A | 10/1994 | Macadam et al. | |
| 5,353,875 A | 10/1994 | Schultz et al. | |
| 5,355,967 A | 10/1994 | Mueller et al. | |
| 5,356,081 A | 10/1994 | Sellar | |
| 5,396,805 A | 3/1995 | Surjaatmadja | |
| 5,411,081 A | 5/1995 | Moore et al. | |
| 5,411,085 A | 5/1995 | Moore et al. | |
| 5,411,105 A | 5/1995 | Gray | |
| 5,413,045 A | 5/1995 | Miszewski | |
| 5,413,170 A | 5/1995 | Moore | |
| 5,419,188 A | 5/1995 | Rademaker et al. | |

(56) References Cited

U.S. PATENT DOCUMENTS

| | | |
|---|---|---|
| 5,423,383 A | 6/1995 | Pringle |
| 5,425,420 A | 6/1995 | Pringle |
| 5,435,351 A | 7/1995 | Head |
| 5,435,395 A | 7/1995 | Connell |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |
| 5,566,764 A | 10/1996 | Elliston |
| 5,573,225 A | 11/1996 | Boyle et al. |
| 5,577,560 A | 11/1996 | Coronado et al. |
| 5,586,609 A | 12/1996 | Schuh |
| 5,599,004 A | 2/1997 | Newman et al. |
| 5,615,052 A | 3/1997 | Doggett |
| 5,638,904 A | 6/1997 | Misselbrook et al. |
| 5,653,897 A * | 8/1997 | Findlan ............... B23K 26/106 219/121.63 |
| 5,655,745 A | 8/1997 | Morrill |
| 5,694,408 A | 12/1997 | Bott et al. |
| 5,707,939 A | 1/1998 | Patel |
| 5,735,502 A | 4/1998 | Levett et al. |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,864,113 A | 1/1999 | Cossi |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A | 10/1999 | Goldner et al. |
| 5,986,236 A | 11/1999 | Gainand et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,084,203 A | 7/2000 | Bonigen |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,300 B1 | 5/2001 | Cunningham et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,354,370 B1 * | 3/2002 | Miller .................... F25B 19/00 165/263 |
| 6,355,928 B1 | 3/2002 | Skinner et al. |
| 6,356,683 B1 | 3/2002 | Hu et al. |
| 6,361,299 B1 * | 3/2002 | Quigley ............... B29C 70/086 428/35.9 |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,426,479 B1 | 7/2002 | Bischof |
| 6,437,326 B1 | 8/2002 | Yamate et al. |
| 6,450,257 B1 | 9/2002 | Douglas |
| 6,494,259 B2 | 12/2002 | Surjaatmadja |
| 6,497,290 B1 | 12/2002 | Misselbrook et al. |
| 6,557,249 B1 * | 5/2003 | Pruett .................. G02B 6/4486 29/33 D |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,634,388 B1 * | 10/2003 | Taylor .................... B29C 63/34 138/104 |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,737,605 B1 | 5/2004 | Kern |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 * | 4/2005 | Batarseh ................ E21B 43/24 166/222 |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |

(56) References Cited

U.S. PATENT DOCUMENTS

| | | | |
|---|---|---|---|
| 7,174,067 B2 | 2/2007 | Murshid et al. | |
| 7,188,687 B2 | 3/2007 | Rudd et al. | |
| 7,195,731 B2 | 3/2007 | Jones | |
| 7,196,786 B2 | 3/2007 | DiFoggio | |
| 7,199,869 B2 | 4/2007 | MacDougall | |
| 7,201,222 B2 | 4/2007 | Kanady et al. | |
| 7,210,343 B2 | 5/2007 | Shammai et al. | |
| 7,212,283 B2 | 5/2007 | Hother et al. | |
| 7,249,633 B2 | 7/2007 | Ravensbergen et al. | |
| 7,264,057 B2 | 9/2007 | Rytlewski et al. | |
| 7,270,195 B2 | 9/2007 | MacGregor et al. | |
| 7,273,108 B2 | 9/2007 | Misselbrook | |
| 7,334,637 B2 | 2/2008 | Smith, Jr. | |
| 7,337,660 B2 | 3/2008 | Ibrahim et al. | |
| 7,362,422 B2 | 4/2008 | DiFoggio et al. | |
| 7,372,230 B2 | 5/2008 | McKay | |
| 7,394,064 B2 | 7/2008 | Marsh | |
| 7,395,696 B2 | 7/2008 | Bissonnette et al. | |
| 7,395,866 B2 | 7/2008 | Milberger et al. | |
| 7,416,032 B2 | 8/2008 | Moeny et al. | |
| 7,416,258 B2 | 8/2008 | Reed et al. | |
| 7,424,190 B2 | 9/2008 | Dowd et al. | |
| 7,471,831 B2 | 12/2008 | Bearman et al. | |
| 7,487,834 B2 * | 2/2009 | Reed | B28D 1/00 166/297 |
| 7,490,664 B2 * | 2/2009 | Skinner | E21B 7/15 166/250.16 |
| 7,503,404 B2 | 3/2009 | McDaniel et al. | |
| 7,515,782 B2 | 4/2009 | Zhang et al. | |
| 7,516,802 B2 | 4/2009 | Smith, Jr. | |
| 7,518,722 B2 | 4/2009 | Julian et al. | |
| 7,527,108 B2 | 5/2009 | Moeny | |
| 7,530,406 B2 | 5/2009 | Moeny et al. | |
| 7,559,378 B2 | 7/2009 | Moeny | |
| 7,587,111 B2 | 9/2009 | de Montmorillon et al. | |
| 7,600,564 B2 | 10/2009 | Shampine et al. | |
| 7,603,011 B2 | 10/2009 | Varkey et al. | |
| 7,617,873 B2 | 11/2009 | Lovell et al. | |
| 7,624,743 B2 | 12/2009 | Sarkar et al. | |
| 7,628,227 B2 | 12/2009 | Marsh | |
| 7,646,953 B2 | 1/2010 | Dowd et al. | |
| 7,647,948 B2 * | 1/2010 | Quigley | D04C 1/06 138/125 |
| 7,671,983 B2 | 3/2010 | Shammai et al. | |
| 7,715,664 B1 | 5/2010 | Shou et al. | |
| 7,720,323 B2 | 5/2010 | Yamate et al. | |
| 7,769,260 B2 | 8/2010 | Hansen et al. | |
| 7,802,384 B2 * | 9/2010 | Kobayashi | E21B 7/00 175/16 |
| 7,834,777 B2 | 11/2010 | Gold | |
| 7,848,368 B2 | 12/2010 | Gapontsev et al. | |
| 7,900,699 B2 | 3/2011 | Ramos et al. | |
| 7,938,175 B2 | 5/2011 | Skinner et al. | |
| 8,011,454 B2 | 9/2011 | Castillo | |
| 8,074,332 B2 | 12/2011 | Keatch et al. | |
| 8,082,996 B2 | 12/2011 | Kocis et al. | |
| 8,091,638 B2 | 1/2012 | Dusterhoft et al. | |
| 8,109,345 B2 | 2/2012 | Jeffryes | |
| 8,175,433 B2 | 5/2012 | Caldwell et al. | |
| 8,322,441 B2 | 12/2012 | Fenton | |
| 8,627,901 B1 | 1/2014 | Underwood | |
| 9,074,422 B2 * | 7/2015 | Grubb | B23K 26/0093 |
| 2002/0007945 A1 | 1/2002 | Neuroth et al. | |
| 2002/0039465 A1 | 4/2002 | Skinner | |
| 2002/0189806 A1 | 12/2002 | Davidson et al. | |
| 2003/0000741 A1 | 1/2003 | Rosa | |
| 2003/0053783 A1 | 3/2003 | Shirasaki | |
| 2003/0056990 A1 | 3/2003 | Oglesby | |
| 2003/0085040 A1 | 5/2003 | Hemphill et al. | |
| 2003/0094281 A1 | 5/2003 | Tubel | |
| 2003/0132029 A1 * | 7/2003 | Parker | B23K 26/0604 175/11 |
| 2003/0145991 A1 | 8/2003 | Olsen | |
| 2003/0159283 A1 | 8/2003 | White | |
| 2003/0160164 A1 | 8/2003 | Jones et al. | |
| 2003/0226826 A1 | 12/2003 | Kobayashi et al. | |
| 2004/0006429 A1 | 1/2004 | Brown | |
| 2004/0016295 A1 | 1/2004 | Skinner et al. | |
| 2004/0020643 A1 | 2/2004 | Thomeer et al. | |
| 2004/0026382 A1 | 2/2004 | Richerzhagen | |
| 2004/0033017 A1 | 2/2004 | Kringlebotn et al. | |
| 2004/0074979 A1 | 4/2004 | McGuire | |
| 2004/0093950 A1 | 5/2004 | Bohnert | |
| 2004/0112642 A1 | 6/2004 | Krueger et al. | |
| 2004/0119471 A1 | 6/2004 | Blanz et al. | |
| 2004/0129418 A1 | 7/2004 | Jee et al. | |
| 2004/0195003 A1 * | 10/2004 | Batarseh | E21B 33/138 175/16 |
| 2004/0200341 A1 * | 10/2004 | Walters | F41H 11/12 89/1.13 |
| 2004/0206505 A1 | 10/2004 | Batarseh | |
| 2004/0207731 A1 | 10/2004 | Bearman et al. | |
| 2004/0211894 A1 | 10/2004 | Hother et al. | |
| 2004/0218176 A1 | 11/2004 | Shammai et al. | |
| 2004/0244970 A1 | 12/2004 | Smith, Jr. | |
| 2004/0252748 A1 | 12/2004 | Gleitman | |
| 2004/0256103 A1 | 12/2004 | Batarseh | |
| 2005/0007583 A1 | 1/2005 | DiFoggio | |
| 2005/0012244 A1 | 1/2005 | Jones | |
| 2005/0034857 A1 * | 2/2005 | Defretin | E21B 47/10 166/250.01 |
| 2005/0094129 A1 | 5/2005 | MacDougall | |
| 2005/0099618 A1 | 5/2005 | DiFoggio et al. | |
| 2005/0115741 A1 | 6/2005 | Terry et al. | |
| 2005/0121094 A1 | 6/2005 | Quigley | |
| 2005/0121235 A1 | 6/2005 | Larsen et al. | |
| 2005/0189146 A1 | 9/2005 | Oglesby | |
| 2005/0201652 A1 | 9/2005 | Ellwood, Jr. | |
| 2005/0230107 A1 | 10/2005 | McDaniel et al. | |
| 2005/0252286 A1 | 11/2005 | Ibrahim et al. | |
| 2005/0263281 A1 | 12/2005 | Lovell et al. | |
| 2005/0268704 A1 | 12/2005 | Bissonnette et al. | |
| 2005/0269132 A1 * | 12/2005 | Batarseh | E21B 7/15 175/40 |
| 2005/0272512 A1 | 12/2005 | Bissonnette et al. | |
| 2005/0272513 A1 | 12/2005 | Bissonnette et al. | |
| 2005/0272514 A1 | 12/2005 | Bissonnette et al. | |
| 2005/0282645 A1 | 12/2005 | Bissonnette et al. | |
| 2006/0038997 A1 | 2/2006 | Julian et al. | |
| 2006/0049345 A1 | 3/2006 | Rao et al. | |
| 2006/0065815 A1 | 3/2006 | Jurca | |
| 2006/0070770 A1 | 4/2006 | Marsh | |
| 2006/0102343 A1 | 5/2006 | Skinner et al. | |
| 2006/0118303 A1 | 6/2006 | Schultz et al. | |
| 2006/0137875 A1 | 6/2006 | Dusterhoft et al. | |
| 2006/0185843 A1 | 8/2006 | Smith, Jr. | |
| 2006/0191684 A1 | 8/2006 | Smith, Jr. | |
| 2006/0204188 A1 | 9/2006 | Clarkson et al. | |
| 2006/0207799 A1 | 9/2006 | Yu | |
| 2006/0231257 A1 | 10/2006 | Reed et al. | |
| 2006/0237233 A1 * | 10/2006 | Reed | B23K 26/0604 175/56 |
| 2006/0257150 A1 | 11/2006 | Tsuchiya | |
| 2006/0260832 A1 | 11/2006 | McKay | |
| 2006/0266522 A1 | 11/2006 | Eoff et al. | |
| 2006/0283592 A1 | 12/2006 | Sierra et al. | |
| 2006/0289724 A1 | 12/2006 | Skinner et al. | |
| 2007/0034409 A1 | 2/2007 | Dale et al. | |
| 2007/0081157 A1 | 4/2007 | Csutak et al. | |
| 2007/0125163 A1 | 6/2007 | Dria et al. | |
| 2007/0193990 A1 | 8/2007 | Richerzhagen et al. | |
| 2007/0217736 A1 | 9/2007 | Zhang et al. | |
| 2007/0227741 A1 | 10/2007 | Lovell et al. | |
| 2007/0242265 A1 | 10/2007 | Vessereau et al. | |
| 2007/0247701 A1 | 10/2007 | Akasaka et al. | |
| 2007/0267220 A1 | 11/2007 | Magiawala et al. | |
| 2007/0278195 A1 | 12/2007 | Richerzhagen et al. | |
| 2007/0280615 A1 | 12/2007 | de Montmorillon et al. | |
| 2008/0023202 A1 | 1/2008 | Keatch et al. | |
| 2008/0053702 A1 | 3/2008 | Smith, Jr. | |
| 2008/0073077 A1 | 3/2008 | Tunc et al. | |
| 2008/0093125 A1 | 4/2008 | Potter et al. | |
| 2008/0112760 A1 | 5/2008 | Curlett | |

(56) References Cited

U.S. PATENT DOCUMENTS

| | | |
|---|---|---|
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2009/0020333 A1 | 1/2009 | Marsh |
| 2009/0031870 A1 | 2/2009 | O'Connor |
| 2009/0033176 A1 | 2/2009 | Huang et al. |
| 2009/0045176 A1 | 2/2009 | Wawers |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0225793 A1* | 9/2009 | Marciante ............... H01S 3/302 372/6 |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1* | 1/2010 | Lovell .................. E21B 47/123 166/255.2 |
| 2010/0025032 A1 | 2/2010 | Smith et al. |
| 2010/0032207 A1 | 2/2010 | Potter et al. |
| 2010/0044102 A1 | 2/2010 | Rinzler et al. |
| 2010/0044103 A1 | 2/2010 | Moxley et al. |
| 2010/0044104 A1 | 2/2010 | Zediker et al. |
| 2010/0044105 A1 | 2/2010 | Faircloth et al. |
| 2010/0044106 A1* | 2/2010 | Zediker .................... E21B 7/14 175/16 |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1* | 6/2010 | Ullah .................. E21B 17/206 166/254.2 |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0215326 A1* | 8/2010 | Zediker .................... E21B 7/14 385/100 |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0326659 A1 | 12/2010 | Schultz et al. |
| 2010/0326665 A1 | 12/2010 | Redlinger et al. |
| 2011/0030367 A1 | 2/2011 | Dadd |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0085149 A1* | 4/2011 | Nathan .................... B41M 1/06 355/53 |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1* | 1/2012 | Rinzler ................. G02B 6/4402 385/109 |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1* | 3/2012 | Dewitt .................... E21B 4/18 175/15 |
| 2012/0068086 A1* | 3/2012 | Dewitt ................... E21B 10/60 250/492.1 |
| 2012/0068523 A1 | 3/2012 | Bowles |
| 2012/0074110 A1* | 3/2012 | Zediker ................. B08B 7/0042 219/121.72 |
| 2012/0103693 A1 | 5/2012 | Jeffryes |
| 2012/0111578 A1 | 5/2012 | Tverlid |
| 2012/0118518 A1 | 5/2012 | Kleefisch et al. |
| 2012/0118578 A1 | 5/2012 | Skinner |
| 2012/0155813 A1* | 6/2012 | Quigley .................. E21B 17/20 385/101 |
| 2012/0217015 A1 | 8/2012 | Zediker et al. |
| 2012/0217017 A1 | 8/2012 | Zediker et al. |
| 2012/0217018 A1 | 8/2012 | Zediker et al. |
| 2012/0217019 A1 | 8/2012 | Zediker et al. |
| 2012/0239013 A1 | 9/2012 | Islam |
| 2012/0248078 A1* | 10/2012 | Zediker .................... E21B 7/14 219/121.67 |
| 2012/0255774 A1 | 10/2012 | Grubb et al. |
| 2012/0255933 A1* | 10/2012 | McKay .................. B08B 9/055 219/61 |
| 2012/0261188 A1 | 10/2012 | Zediker et al. |
| 2012/0266803 A1 | 10/2012 | Zediker et al. |
| 2012/0267168 A1* | 10/2012 | Grubb .................. B23K 26/0093 175/16 |
| 2012/0273269 A1 | 11/2012 | Rinzler et al. |
| 2012/0273470 A1* | 11/2012 | Zediker ................ B23K 26/142 219/121.61 |
| 2012/0275159 A1 | 11/2012 | Fraze et al. |
| 2013/0011102 A1 | 1/2013 | Rinzler et al. |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1* | 9/2013 | Linyaev .................. E21B 7/15 175/16 |
| 2013/0228557 A1 | 9/2013 | Zediker |
| 2013/0266031 A1 | 10/2013 | Norton |
| 2013/0319984 A1* | 12/2013 | Linyaev ................ B23K 26/38 219/121.72 |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1* | 4/2014 | Deutch .................. E21B 29/00 166/297 |
| 2014/0190949 A1* | 7/2014 | Zediker ................ B23K 26/282 219/121.72 |
| 2014/0231085 A1 | 8/2014 | Zediker |
| 2014/0231398 A1 | 8/2014 | Land |

(56) References Cited

U.S. PATENT DOCUMENTS

| | | | |
|---|---|---|---|
| 2014/0248025 A1 | 9/2014 | Rinzler | |
| 2014/0345872 A1 | 11/2014 | Zediker | |
| 2016/0186497 A1* | 6/2016 | Grubb | B23K 26/0093 |
| | | | 175/15 |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 A1 | 9/1995 |
| GB | 1 284 454 | 8/1972 |
| GB | 2420358 B | 5/2006 |
| JP | 09-072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,509, filed Feb. 23, 2012, Fraze et al.
U.S. Appl. No. 13/486,795, filed Jun. 1, 2012, Rinzler et al.
U.S. Appl. No. 13/403,615, filed Feb. 23, 2012, Grubb et al.
U.S. Appl. No. 13/366,882, filed Feb. 6, 2012, McKay et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,132, filed Feb. 23, 2012, Zediker et al.
U.S. Appl. No. 13/403,741, filed Feb. 23, 2012, Zediker et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Linyaev et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
U.S. Appl. No. 13/852,719, filed Mar. 28, 2013, Faircloth et al.
International Search Report and Written Opinion of the International Searching Authority for PCT Application No. PCT/US2010/024368, dated Nov. 2, 2010, 16 pgs.
International Search Report and Written Opinion of the International Searching Authority for PCT Application No. PCT/US2009/054295, dated Apr. 26, 2010, 16 pgs.
International Search Report and Written Opinion of the International Searching Authority for PCT Application No. PCT/US2011/044548, dated Jan. 24, 2012, 17 pgs.
International Search Report and Written Opinion of the International Searching Authority for PCT Application No. PCT/US2011/047902, dated Jan. 17, 2012, 9 pgs.
International Search Report and Written Opinion of the International Searching Authority for PCT Application No. PCT/US2011/050044 dated Feb. 1, 2012, 26 pgs.
International Search Report and Written Opinion of the International Searching Authority for PCT Application No. PCT/US2012/026277, dated May 30, 2012, 11 pgs.
International Search Report and Written Opinion of the International Searching Authority for PCT Application No, PCT/US2012/026265, dated May 30, 2012, 14 pgs.
International Search Report and Written Opinion of the International Searching Authority for PCT Application No. PCT/US2012/026280, dated May 30, 2012, 12 pgs.
International Search Report and Written Opinion of the International Searching Authority for PCT Application No, PCT/US2012/026337, dated Jun. 7, 2012, 21 pgs.
International Search Report and Written Opinion of the International Searching Authority for PCT Application No. PCT/US2012/026471, dated May 30, 2012, 13 pgs.
International Search Report and Written Opinion of the International Searching Authority for PCT Application No. PCT/US2012/026525, dated May 31, 2012, 8 pgs.
International Search Report and Written Opinion of the International Searching Authority for PCT Application No. PCT/US2012/026526, dated May 31, 2012, 10 pgs.
International Search Report and Written Opinion of the International Searching Authority for PCT Application No. PCT/US2012/026494, dated May 31, 2012, 12 pgs.
International Search Report and Written Opinion of the International Searching Authority for PCT Application No. PCT/US2012/020789, dated Jun. 29, 2012, 9 pgs.
International Search Report and Written Opinion of the International Searching Authority for PCT Application No. PCT/US2012/040490, dated Oct. 22, 2012, 14 pgs.
International Search Report and Written Opinion of the International Searching Authority for PCT Application No. PCT/US2012/049338, dated Jan. 22, 2013, 14 pgs.
Abdulagatova, Z. et al., "Effect of Temperature and Pressure on the Thermal Conductivity of Sandstone", *international Journal of Rock Mechanics & Mining Sciences*, vol. 46, 2009, pp. 1055-1071.

(56) References Cited

OTHER PUBLICATIONS

Abousleiman, Y. et al., "Poroelastic Solution of an Inclined Borehole in a Transversely Isotropic Medium", *Rock Mechanics*, Daemen & Schultz (eds), 1995, pp. 313-318.

Ackay, H. et al., Paper titled "Orthonormal Basis Functions for Continuous-Time Systems and Lp Convergence", date unknown but prior to Aug. 19, 2009, pp. 1-12.

Acosta, A. et al., paper from X Brazilian MRS meeting titled "Drilling Granite With Laser Light", X Encontro da SBPMat Granado-RS, Sep. 2011, 4 pages including pp. 56 and 59.

Agrawal Dinesh et al., "Microstructural by TEM of Wc/Co composites Prepared by Conventional and Microwave Processes", Materials Research Lab, The Pennsylvania State University, *15International Plansee Seminar*, vol. 2, , 2001, pp. 677-684.

Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.

Agrawal Dinesh et al,, Report on "Graded Steele-Tungsten Cardide/ Cobalt-Diamond Systems Using Microwave Heating", Material Research Institute, Penn State University. *Proceedings of the 2002 International Conference on Functionally Graded Materials*, 2002, pp. 50-58.

Agrawal, Govind P., "Nonlinear Fiber Optics", Chap. 9, Fourth Edition, Academic Press copyright 2007, pp. 334-337.

Ahmadi, M. et al., "The Effect of Interaction Time and Saturation of Rock on Specific Energy in ND:YAG Laser Perforating", *Optics and Laser Technology*, vol. 43, 2011, pp. 226-231.

Ai, H.A. et al., "Simulation of dynamic response of granite: A numerical approach of shock-induced damage beneath impact craters", *International Journal of Impact Engineering*, vol. 33, 2006, pp. 1-10.

Akhatov, I. et al., "Collapse and Rebound of a Laser-Induced Cavitation Bubble", *Physics of Fluids*, vol. 13, No. 10, Oct. 2001, pp. 2805-2819.

Albertson, M. L. et al., "Diffusion of Submerged Jets", a paper for the *American Society of Civil Engineers*, Nov. 5, 1852, pp. 1571-1596.

Al-Harthi, A. A. et al., "The Porosity and Engineering Properties of Vesicular Basalt in Saudi Arabia", *Engineering Geology*, vol. 54, 1999, pp. 313-320.

Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.

Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.

Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.

Anton, Richard J. et al., "Dynamic Vickers indentation of brittle materials", *Wear*, vol. 239, 2000, pp. 27-35.

Antonucci, V. et al., "Numerical and Experimental Study of a Concentrated Indentation Force on Polymer Matrix Composites", an excerpt from the *Proceedings of the COMSOL Conference*, 2009, 4 pages.

Aptukov, V. N., "Two Stages of Spallation", publisher unknown, while the date of the publication is unknown, it is believed to be prior to Aug. 19, 2009, 6 pages.

Ashby, M. F. et al., "The Failure of Brittle Solids Containing Small Cracks Under Compressive Stress States", *Acta Metall.*, vol. 34, No. 3, 1986, pp. 497-510.

ASTM International, "Standard Test Method for Thermal Conductivity of Solids by Means of the Guarded-Comparative-Longitudinal Heat Flow Technique", Standard under the fixed Designation E1225-09, 2009, pp. 1-9.

Atkinson, B. K., "Introduction to Fracture Mechanics and Its Geophysical Applications", *Fracture Mechanics of Rock*, 1987, pp. 1-26.

Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.

Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.

Avar, B. B. et al., "Porosity Dependence of the Elastic Modulof Lithophysae-rich Tuff: Numerical and Experimental Investigations", *International Journal of Rock Mechanics & Mining Sciences*, vol. 40, 2003, pp. 919-928.

Aydin, A. et al., "The Schmidt hammer in rock material characterization", *Engineering Geology*, vol. 81, 2005, pp. 1-14.

Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.

Baek, S. Y. et al., "Simulation of the Coupled Thermal/Optical Effects for Liquid Immersion Micro-/Nanolithography", source unknown, believed to be publically available prior to 2012, 13 pages.

Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.

Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.

Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.

Baird, J. A. "GEODYN: A Geological Formation/Drillstring Dynamics Computer Program", *Society of Petroleum Engineers of AIME*, 1964, 9 pgs.

Baird, J. A. et al., "Analyzing the Dynamic Behavior of Downhole Equipment During Drilling", government Sandia Report, SAND-84-0758C, DE84 008840, 7 pages. undated.

Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.

Batarseh, S. I. et al, "Innovation in Wellbore Perforation Using High-Power Laser", *International Petroleum Technology Conference*, IPTC No. 10981, Nov. 2005, 7 pages.

Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.

Baykasogiu, A. et al., "Prediction of Compressive and Tensile Strength of Limestone via Genetic Programming", *Expert Systems with Applications*, vol. 35, 2008, pp. 111-123.

BDM Corporation, Geothermal Completion Technology Life-Cycle Cost Model (GEOCOM). *Sandia National Laboratories*, for the U.S. Dept. of Energy, vols. 1 and 2, 1982, 222 pgs.

Bechtel SAIC Company LLC, "Heat Capacity Analysis", a report prepared for Department of Energy, Nov. 2004, 100 pages.

Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010; 18 pages.

Belyaev, V. V., "Spall Damage Modelling and Dynamic Fracture Specificities of Ceramics", *Journal of Materials Processing Technology*, vol. 32, 1992, pp. 135-144.

Benavente, D. et al., "The Combined Influence of Mineralogical, Hygric and Thermal Properties on the Durabllity of PoroBuilding Stones", *Eur. J. Mineral*, vol. 20, Aug. 2008, pp. 673-685.

(56) References Cited

OTHER PUBLICATIONS

Beste, U. et al., "Micro-scratch evaluation of rock types—a means to comprehend rock drill wear", *Tribology International*, vol. 37, 2004, pp. 203-210.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.
Blackwell, B. F., "Temperature Profile in Semi-infinite Body With Exponential Source and Convective Boundary Condition", *Journal of Heat Transfer, Transactions of the ASME*, vol. 112, 1990, pp. 567-571.
Blackwell, D. D. et al., "Geothermal Resources in Sedimentary Basins", a presentation for the Geothermal Energy Generation in Oil and Gas Settings, Mar. 13, 2006, 28 pages.
Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.
Blomqvist, M. et al., "All-in-Quartz Optics for Low Focal Shifts", *SPIE Photonics West Conference in San Francisco*, Jan. 2011, 12 pages.
Boechat, A. A. P. et al., "Bend Loss in Large Core Multimode Optical Fiber Beam Delivery Systems", *Applied Optics.*, vol. 30 No. 3, Jan. 20, 1991, pp. 321-327.
Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.
Britz, Dieter, "Digital Simulation in Electrochemistry", *Lect. Notes Phys.*, vol. 666, 2005, pp. 103-117.
Brown, G., "Development, Testing and Track Record of Fiber-Optic, Wet-Mate, Connectors", *IEEE*, 2003, pp. 83-88.
Browning, J. A. et al., "Recent Advances in Flame Jet Working of Minerals", *7th Symposium on Rock Mechanics*, Pennsylvania State Univ., 1965, pp. 281-313.
Brujan, E. A. et al., "Dynamics of Laser-Induced Cavitation Bubbles Near an Elastic Boundar", *J. Fluid Mech.*, vol. 433, 2001, pp. 251-281.
Burdine, N. T., "Rock Failure Under Dynamic Loading Conditions", Society of Petroleum Engineers Journal, Mar. 1963, pp. 1-8.
Bybee, K., "Modeling Laser-Spallation Rock Drilling", *JPT*, an SPE available at www.spe.org/jpt, Feb. 2006, 2 pp. 62-63.
Bybee, Karen, highlight of "Drilling a Hole in Granite Submerged in Water by Use of CO2 Laser", an SPE available at www.spe.org/jpt, *JPT*, Feb. 2010, pp. 48, 50 and 51.
Cai, W. et al., "Strength of Glass from Hertzian Line Contact", *Optomechanics 2011: Innovations and Solutions*, 2011, 5 pages.
Capetta, I. S. et al., "Fatigue Damage Evaluation on Mechanical Components Under Multiaxial Loadings", European Comsol Conference, University of Ferrara, Oct. 16, 2009, 25 pages.
Cardenas, R., "Protected Polycrystalline Diamond Compact Bits for Hard Rock Drilling", Report No. DOE-99049-1381, *U.S. Department of Energy*, 2000, pp. 1-79.
Carstens, J. P. et al., "Rock Cutting by Laser", a paper of *Society of Petroleum Engineers of AIME*, 1971, 11 pages.
Carstens, Jeffrey et al., "Heat-Assisted Tunnel Boring Machines", *Federal Railroad Administration and Urban Mass Transportation Administration*, U.S. Dept. of Transportation, Resort No. FRA-RT-71-63, 1970, 340 pgs.
Caruso, C. et al., "Dynamic Crack Propagation in Fiber Reinforced Composites", Excerpt from the Proceedings of the COMSOL Conference, 2009, 5 pages.
Chastain, T. et al., "Deepwater Drilling Riser System", *SPE Drilling Engineering*, Aug. 1986, pp. 325-328.
Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.
Chen, K., paper titled "Analysis of Oil Film Interferometry Implementation in Non-Ideal Conditions", source unknown, Jan. 7, 2010, pp. 1-18.
Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.
Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.
Cimetiere, A. et al., "A Damage Model for Concrete Beams in Compression", *Mechanics Research Communications*, vol. 34, 2007, pp. 91-96.
Clegg, John et al., "Improved Optimisation of Bit Selection Using Mathematically Modelled Bit-Performance Indices", *IADC/SPE International 102287*, 2006, pp. 1-10.
Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.
Cobern, Martin E., "Downhole Vibration Monitoring & Control System Quarterly Technical Report #1", *APS Technology, Inc.*, Quarterly Technical Report #1, DVMCS, 2003, pp. 1-15.
Cogotsi, G. A, et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.
Cohen, J. H., "High-Power Slim-Hole Drilling System", a paper presented at the conference entitled Natural Gas RD&D Contractor's Review Meeting, Office of Scientific and Technical Information, Apr. 1995, 10 pages.
Cone, C., "Case History of the University Block 9 (Wolfcamp) Field—Gas-Water Injection Secondary Recovery Project", *Journal of Petroleum Technology*, Dec. 1970, pp. 1485-1491.
Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.
Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.
Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.
Coray, P. S. et al., "Measurements on 5:1 Scale Abrasive Water Jet Cutting Head Models", source unknown, available prior to 2012, 15 pages.
Cruden, D. M., "The Static Fatigue of Brittle Rock Under Uniaxial Compression", *Int. J. Rock Mech. Min. Sci. & Geomech. Abstr.*, vol. 11, 1974, pp. 67-73.
da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.
Dahl, Filip et al., "Development of a new direct test method for estimating cutter life, based on the Sievers J miniature drill test", *Tunnelling and Underground Space Technology*, vol. 22, 2007, pp. 106-116.
Damzen, M. J. et al., "Stimulated Brillion Scattering", Chapter 8—SBS in Optical Fibres, OP Publishing Ltd, Published by Institute of Physics, London, England, 2003, pp. 137-153.

(56) References Cited

OTHER PUBLICATIONS

Das, A. C. et al., "Acousto-ultrasonic study of thermal shock damage in castable refractory", *Journal of Materials Science Letters*, vol. 10, 1991, pp. 173-175.

de Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.

De Guire, Mark R., "Thermal Expansion Coefficient (start)", *EMSE 201—Introduction to Materials Science & Engineering*, 2003, pp. 15.1-15.15.

Degallaix, J. et al., "Simulation of Bulk-Absorption Thermal Lensing in Transmissive Optics of Gravitational Waves Detector", *Appl. Phys.*, B77, 2003, pp. 409-414.

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Diamond-Cuter Drill Bits, by Geothermal Energy Program, Office of Geothermal and Wind Technologies, 2000, 2 pgs.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.

Dinçer, Ismail et al., "Correlation between Schmidt hardness, uniaxial compressive strength and Young's modulfor andesites, basalts and tuffs", *Bull Eng Geol Env*, vol. 63, 2004, pp. 141-148.

Dole, L. et al., "Cost-Effective CementitioMaterial Compatible with Yucca Mountain Repository Geochemistry": a paper prepared by Oak Ridge National Laboratory for the Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

Dunn, James C., "Geothermal Technology Development at Sandia", *Geothermal Research Division, Sandia National Laboratories*, 1987, pp. 1-6.

Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-888.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Eichler, H.J. et al., "Stimulated Brillouin Scattering in Multimode Fibers for Optical Phase Conjugation", *Optics Communications*, vol. 208, 2002, pp. 427-431.

Eighmy, T. T. et al., "Microfracture Surface Charaterizations: Implications for In Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

Ersoy, A., "Wear Characteristics of PDC Pin and Hybrid Core Bits in Rock Drilling", *Wear*, vol. 188, 1995, pp. 150-165.

Extreme Coil Drilling, by Extreme Drilling Corporation, 2009, 10 pgs.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Ferro, D. et al., "Vickers and Knoop hardness of electron beam deposited ZrC and HfC thin films on titanium", *Surface & Coatings Technology*, vol. 200, 2006, pp. 4701-4707.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, J. T. et al., "PDC Bit Research at Sandia National Laboratories", Sandia Report No. SAND89-0079-UC-253, a report prepared for Department of Energy, Jun. 1989, 88 pages.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C. et al., "Laser Drilling: Determination of Energy Required to Remove Rock", *Society of Petroleum Engineers International*, SPE 71466, 2001, pp. 1-11.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

(56) References Cited

OTHER PUBLICATIONS

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A., "The Use of Single-Cutter Data in the Analysis of PDC Bit Designs", *61st Annual Technical Conference and Exhibition of Society of Petroleum Engineers*, 1986, pp. 1-37.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, 13 pages. undated.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, 761-770.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Gurarie. V. N., "Stress Resistance Parameters of Brittle Solids Under Laser/Plasma Pulse Heating", *Materials Science and Engineering*, vol. A288, 2000, pp. 168-172.

Habib, P. et al., "The Influence of Residual Stresses on Rock Hardness", *Rock Mechanics*, vol. 6, 1974, pp. 15-24.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hall, Kevin, "The role of thermal stress fatigue in the breakdown of rock in cold regions", *Geomorphology*, vol. 31, 1999, pp. 47-63.

Hammer, D. X. et al., "Shielding Properties of Laser-induced Breakdown in Water for Pulse Durations from 5 ns to 125 fs", *Applied Optics*, vol. 36, No. 22, Aug. 1, 1997, pp. 5630-5640.

Han, Wei, "Computational and experimental investigations of laser drilling and welding for microelectronic packaging", *Dorchester Polytechnic Institute*, A Dissertation submitted in May 2004, 242 pgs.

Hancock, M. J., "The 1-D Heat Equation: 18.303 Linear Partial Differential Equations", source unknown, 2004, pp. 1-41.

Hareland, G, et al., "Drag—Bit Model Including Wear", *SPE*, No. 26957, a paper prepared for presentation at the Latin American/Caribbean Petroleum Engineering Conference, Apr. 1994, pp. 657-667.

Hareland, G., et al., "Cutting Efficiency of a Single PDC Cutter on Hard Rock", *Journal of Canadian Petroleum Technology*, vol. 48, No. 6, 2009, pp. 1-6.

Hareland, G., et al, "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.

Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Healy, Thomas E., "Fatigue Crack Growth in Lithium Hydride", *Lawrence Livermore National Laboratory*, 1993, pp. 1-32.

Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998, pp. 3-15.

Hibbs, Louis E. et al., "Wear Mechanisms for Polycrystalline-Diamond Compacts as Utilized fro Drilling in Geothermal Environments", *Sandia National Laboratories*, for the United States Government, Report No. SAND-82-7213, 1983, 287 pgs.

Hoek, E., "Fracture of Anisotropic Rock", *Journal of the South African Institute of Mining and Metallurgy*, vol. 64, No. 10, 1964, pp. 501-523.

Hood, M., "Waterjet-Assisted Rock Cutting Systems—The Present State of the Art", *International Journal of Mining Engineering*, vol. 3, 1985, pp. 91-111.

Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the 10American Waterjet Confeence in Houston, Texas, 1999, 25 pages.

Hu, H. et al., "SimultaneoVelocity and Concentration Measurements of a Turbulent Jet Mixing Flow", *Ann. N.Y. Acad. Sci.*, vol. 972, 2002, pp. 254-259.

Huang, C. et al., "A Dynamic Damage Growth Model for Uniaxial Compressive Response of Rock Aggregates", *Mechanics of Materials*, vol. 34, 2002, pp. 267-277.

Huang, H. et al., "Intrinsic Length Scales in Tool-Rock Interaction", *International Journal of Geomechanics*, Jan./Feb. 2008, pp. 39-44.

(56) References Cited

OTHER PUBLICATIONS

Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.

Huff, C. F. et al., "Recent Developments in Polycrystalline Diamond-Drill-Bit Design", *Drilling Technology Division—4741, Sandia National Laboratories*, 1980, pp. 1-29.

Hutchinson, J. W., "Mixed Mode Cracking in Layered Materials", *Advances in Applied Mechanics*, vol. 29, 1992, pp. 63-191.

IADC Dull Grading System for Fixed Cutter Bits, by Hughes Christensen, 1996, 14 pgs.

Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.

Jackson, M. K. et al., "Nozzle Design for Coherent Water Jet Production", source unknown, believed to be published prior to 2012, pp. 53-89.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.

Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.

Jimeno, Carlos Lopez et al., Drilling and Blasting of Rocks, a. a. Balkema Publishers, 1995, 30 pgs.

Judzis, A. et al., "Investigation of Smaller Footprint Drilling System; Ultra-High Rotary Speed Diamond Drilling Has Potential for Reduced Energy Requirements", IADC/SPE No. 99020, 33 pages.

Jurewicz, B. R., "Rock Excavation with Laser Assistance", *Int. J. Rock Mech. Min. Sci. & Geomech. Abstr.*, vol. 13, 1976, pp. 207-219.

Kahraman, S. et al., "Dominant rock properties affecting the penetration rate of percussive drills", *International Journal of Rock Mechanics and Mining Sciences*, 2003, vol. 40, pp. 711-723.

Karakas, M., "Semianalytical Productivity Models for Perforated Completions", *SPE*, No. 18247, a paper for SPE (Society of Petroleum Engineers) Production Engineering, Feb. 1991, pp. 73-82.

Karasawa, H. et al., "Development of PDC Bits for Downhole Motors", *Proceedings 17th NZ Geothermal Workshop*, 1995, pp. 145-150.

Kelsey, James R., "Drilling Technology/GDO", *Sandia National Laboratories*, SAND-85-1866c, DE85 017231, 1985, pp. 1-7.

Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.

Kerr, Callin Joe, "PDC Drill Bit Design and Field Application Evolution", *Journal of Petroleum Technology*, 1988, pp. 327-332.

Ketata, C. et al., "Knowledge Selection for Laser Drilling in the Oil and Gas Industry", *Computer Society*, 2005, pp. 1-6.

Khan, Ovais U. et al., "Laser heating of sheet metal and thermal stress development", *Journal of Materials Processing Technology*, vol. 155-156, 2004, pp. 2045-2050.

Khandelwal, M., "Prediction of Thermal Conductivity of Rocks by Soft Computing", *Int. J. Earth Sci. (Geol. Rundsch)*, May 11, 2010, 7 pages.

Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.

Kim, K. R. et al., "$CO_2$ laser-plume interaction in materials processing", *Journal of Applied Physics*, vol. 89, No. 1, 2001, pp. 681-688.

Kiwata, T. et al., "Flow Visualization and Characteristics of a Coaxial Jet with a Tabbed Annular Nozzle", *JSME International Journal Series B*, vol. 49, No. 4, 2006, pp. 906-913.

Klotz, K. et al., "Coatings with intrinsic stress profile: Refined creep analysis of (Ti,A1)N and cracking due to cyclic laser heating", *Thin Solid Films*, vol. 496, 2006, pp. 469-474.

Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.

Kobyakov, A. et al., "Design Concept for Optical Fibers with Enhanced SBS Threshold", *Optics Express*, vol. 13, No. 14, Jul. 11, 2005, pp. 5338-5346.

Kolari, K., "Damage Mechanics Model for Brittle Failure of Transversely Isotropic Solids (Finite Element Implementation)", *VTT Publications 628*, 2007, 210 pages.

Kollé, J. J., "A Comparison of Water Jet, Abrasive Jet and Rotary Diamond Drilling in Hard Rock", *Tempress Technologies Inc.*, 1999, pp. 1-8.

Kolle, J. J., "HydroPulse Drilling", a Final Report for Department of Energy under Cooperative Development Agreement No. DE-FC26-FT34367, Apr. 2004, 28 pages.

Kovalev, V. I. et al., "Observation of Hole Burning in Spectrum in SBS in Optical Fibres Under CW Monochromatic Laser Excitation", *IEEE*, Jun. 3, 2010, pp. 56-57.

Koyamada, Y. et al., "Simulating and Designing Brillouin Gain Spectrum in Single-Mode Fibers", *Journal of Lightwave Technology*, vol. 22, No. 2, Feb. 2004, pp. 631-639.

Krajcinovic, D. et al., "A Micromechanical Damage Model for Concrete", *Engineering Fracture Mechanics*, vol. 25, No. 5/6, 1986, pp. 585-596.

Kranz, R. L., "Microcracks in Rocks: A Review", *Tectonophysics*, vol. 100, 1983, pp. 449-480.

Kubacki, Emily et al., "Optics for Fiber Laser Applications", CVI Laser, LLC, Technical Reference Document #20050415, 2005, 5 pgs.

Kujawski, Daniel, "A fatigue crack driving force parameter with load ratio effects", *International Journal of Fatigue*, vol. 23, 2001, pp. 3239-3246.

Labuz, J. F. et al., "Experiments with Rock: Remarks on Strength and Stability Issues", *International Journal of Rock Mechanics & Mining Science*, vol. 44, 2007, pp. 525-537.

Labuz, J. F. et al., "Size Effects in Fracture of Rock", *Rock Mechanics for Industry*, Amadei, Kranz, Scott & Smeallie (eds), 1999, pp. 1137-1143.

Labuz, J. F. et al., "Microrack-dependent fracture of damaged rock", *International Journal of Fracture*, vol. 51, 1991, pp. 231-240.

Lacy, Lewis L., "Dynamic Rock Mechanics Testing for Optimized Fracture Designs", *Society of Petroleum Engineers International, Annual Technical Conference and Exhibition*, 1997, pp. 23-36.

Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.

Langeveld, C. J., "PDC Bit Dynamics", a paper prepared for presentation at the 1992 IADC/SPE Drilling Conference, Feb. 1992, pp. 227-241.

Lau, John H., "Thermal Fatigue Life Prediction of Flip Chip Solder Joints by Fracture Mechanics Method", *Engineering Fracture Mechanics*, vol. 45, No. 5, 1993, pp. 643-654.

Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.

Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.

(56) References Cited

OTHER PUBLICATIONS

Leong, K. H. et al., "Lasers and Beam Delivery for Rock Drilling", *Argonne National Laboratory*, ANL/TD/TM03-01, 2003, pp. 1-35.
Leong, K. H., "Modeling Laser Beam-Rock Interaction", a report prepared for Department of Energy (http://www.doe.gov/bridge), 8 pages. undated.
Leung, M. et al., "Theoretical study of heat transfer with moving phase-change interface in thawing of frozen food", *Journal of Physics D: Applied Physics*, vol. 38, 2005, pp. 477-482.
Li, Q. et al., "Experimental Research on Crack Propagation and Failure in Rock-type Materials under Compression", *EJGE*, vol. 13, Bund. D, 2008, p. 1-13.
Li, X. B. et al., "Experimental Investigation in the Breakage of Hard Rock by the PDC Cutters with Combined Action Modes", *Tunnelling and Underground Space Technology*, vol. 16., 2001, pp. 107-114.
Liddle, D. et al., "Cross Sector Decommissioning Workshop", presentation, Mar. 23, 2011, 14 pages.
Lima, R. S. et al., "Elastic ModulMeasurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", *Sandia National Laboratories*, SAND-81-1470C, 1981, pp. 1-6.
Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.
Loland, K. E., "ContinuoDamage Model for Load-Response Estimation of Concrete", *Cement and Concrete Research*, vol. 10, 1980, pp. 395-402.
Lomov, I. N. et al., "Explosion in the Granite Field: Hardening and Softening Behavior in Rocks", *U.S. Department of Energy, Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.
Lubarda, V. A. et al., "Damage Model for Brittle Elastic Solids with Unequal Tensile and Compressive Strengths", *Engineering Fracture Mechanics*, vol. 29, No. 5, 1994, pp. 681-692.
Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.
Luffel, D. L. et al., "Travis Peak Core Permeability and Porosity Relationships at Reservoir Stress", *SPE Formation Evaluation*, Sep. 1991, pp. 310-318.
Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.
Lund, M. et al., "Specific Ion Binding to Macromolecules: Effect of Hydrophobicity and Ion Pairing", *Langmuir*, 2008 vol. 24, 2008, pp. 3387-3391.
Lyons, K. David et al., "NETL Extreme Drilling Laboratory Studies High Pressure High Temperature Drilling Phenomena", *U.S. Department of Energy, National Energy Technology Laboratory*, 2007, pp. 1-6.
Manrique, E. J. et al., "EOR Field Experiences in Carbonate Reservoirs in the United States", *SPE Reservoir Evaluation & Engineering*, Dec. 2007, pp. 667-686.
Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.
Marcuse, D., "Curvature Loss Formula for Optical Fibers", *J. Opt. Soc. Am.*, vol. 66, No. 3, 1976, pp. 216-220.
Marshall, David B. et al., "Indentation of Brittle Materials", *Microindentation Techniques in Materials Science and Engineering, ASTM STP 889; American Society for Testing and Materials*, 1986, pp. 26-46.
Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.
Martins, A. et al., "Modeling of Bend Losses in Single-Mode Optical Fibers", Institutu de Telecomunicacoes, Portugal, 3 pages.
Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.
Maurer, William C., "Advanced Drilling Techniques", published by Petroleum Publishing Co., copyright 1980, 26 pgs.
Maurer, William C., "Novel Drilling Techniques", published by Pergamon Press, UK, copyright 1968, pp. 1-64.
Mazerov, Katie, "Bigger coil sizes, hybrid rigs, rotary steerable advances push coiled tubing drilling to next level", *Drilling Contractor*, 2008, pp. 54-60.
McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.
McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.
Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.
Meister, S. et al., "Glass Fibers for Stimulated Brillouin Scattering and Phase Conjugation", *Laser and Particle Beams*, vol. 25, 2007, pp. 15-21.
Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.
Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.
Mensa-Wilmot, Graham et al., "Advanced Cutting Structure Improves PDC Bit Performance in Hard and Abrasive Drilling Environments", *Society of Petroleum Engineers International*, 2003, pp. 1-13.
Messaoud, Louafi, "Influence of Fluids on the Essential Parameters of Rotary Percussive Drilling", *Laboratoire d'Environnement (Tébessa)*, vol. 14, 2009, pp. 1-8.
Messina, Å. et al., "Theory of Fiber-Optic Evanescent-Wave Spectroscopy and Sensor", *Applied Optics*, vol. 35, No. 13, May 1, 1996, pp. 2274-2284.
Mills, W. R. et al., "Pulsed Neutron Porosity Logging", SPWLA Twenty-Ninth Annual Logging Symposium, Jun. 1988, pp. 1-21.
Mirkovich, V. V., "Experimental Study Relating Thermal Conductivity to Thermal Piercing of Rocks", *Int. J. Rock Mech. Min. Sci.*, vol. 5, 1968, pp. 205-218.
Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.
Moavenzadeh, F. et al., "Thin Disk Technique for Analyzing Fock Fractures Induced by Laser Irradiation", a report prepared for the Department of Transportation under Contract C-85-65, May 1968, 91 pages.

(56) References Cited

OTHER PUBLICATIONS

Mocofanescu, A. et al., "SBS threshold for single mode and multimode GRIN fibers in an all fiber configuration", *Optics Express*, vol. 13, No. 6, 2005, pp. 2019-2024.
Montross, C. S. et al., "Laser-Induced Shock Wave Generation and Shock Wave Enhancement in Basalt", *International Journal of Rock Mechanics and Mining Sciences*, 1999, pp. 849-855.
Moradian, Z. A. et al., "Predicting the Uniaxial Compressive Strength and Static Young's Modulof Intact Sedimentary Rocks Using the Ultrasonic Test", *International Journal of Geomechanics*, vol. 9, No. 1, 2009, pp. 14-19.
Morozumi, Y. et al., "Growth and Structures of Surface Disturbances of a Round Liquid Jet in a Coaxial Airflow", *Fluid Dynamics Research*, vol. 34, 2004, pp. 217-231.
Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.
Moshier, S. O., "Microporosity in Micritic Limestones: A Review", *Sedimentary Geology*, vol. 63, 1989, pp. 191-213.
Mostafa, M. S. et al., "Investigation of Thermal Properties of Some Basalt Samples in Egypt", *Journal of Thermal Analysis and Calorimetry*, vol. 75, 2004, pp. 178-188.
Mukhin, I. B. et al., "Experimental Study of Kilowatt-Average-Power Faraday Isolators", OSA/ASSP, 2007, 3 pages.
Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.
Munro, R. G., "Effective Medium Theory of the Porosity Dependence of Bulk Moduli", *Communications of American Ceramic Society*, vol. 84, No. 5, 2001, pp. 1190-1192.
Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.
Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.
Muto, Shigeki et al., "Laser cutting for thick concrete by multi-pass technique", *Chinese Optics Letters*, vol. 5 Supplement, 2007, pp. S39-S41.
Myung, I. J., "Tutorial on Maximum Likelihood Estimation", *Journal of Mathematical Psychology*, vol. 47, 2003, pp. 90-100.
Nakano, A. et al., "Visualization for Heat and Mass Transport Phenomena in Supercritical Artificial Air", *Cryogenics*, vol. 45, 2005, pp. 557-565.
Nagavi, I. Z. et al., "Laser heating of multilayer assembly and stress levels: elasto-plastic consideration", *Heat and Mass Transfer*, vol. 40, 2003, pp. 25-32.
Nara, Y. et al., "Study of Subcritical Crack Growth in Andesite Using the Double Torsion Test", *International Journal of Rock Mechanics & Mining Sciences*, vol. 42, 2005, pp. 521-530.
Nara, Y. et al., "Sub-critical crack growth in anisotropic rock", *International Journal of Rock Mechanics and Mining Sciences*, vol. 43, 2006, pp. 437-453.
Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.
Nicklaus, K. et al., "Optical Isolator for Unpolarized Laser Radiation at Multi-kilowatt Average Power", *Optical Society of America*, 2005, 3 pages.
Nikles, M. et al., "Brillouin Gain Spectrum Characterization in Single-Mode Optical Fibers", *Journal of Lightwave Technology*, vol. 15, No. 18, Oct. 1997, pp. 1842-1851.
Nilsen, B. et al., "Recent Developments in Site Investigation and Testing for Hard Rock TBM Projects", *1999 RETC Proceedings*, 1999, pp. 715-731.
Nimick, F. B., "Empirical Relationships Between Porosity and the Mechanical Properties of Tuff", *Key Questions in Rock Mechanics*, Cundall et al. (eds), 1988, pp. 741-742.
Nolen-Hoeksema, R., "Fracture Development and Mechnical Stratigraphy of Austin Chalk, Texas: Discussion", a discussion for the American Association of Petroleum Geologists Bulletin, vol. 73, No. 6, Jun. 1989, pp. 792-793.
O'Hare, Jim et al., "Design Index: A Systematic Method of PDC Drill-Bit Selection", *Society of Petroleum Engineers International*, IADC/SPE Drilling Conference, 2000, pp. 1-15.
Oglesby, K. et al., "Advanced Ultra High Speed Motor for Drilling", a project update by Impact Technologies LLC for the Department of Energy, Sep. 12, 2005, 36 pages.
Okon, P. et al., "Laser Welding of Aluminium Alloy 5083", *21st International Congress on Applications of Lasers and Electro-Optics*, 2002, pp. 1-9.
Olsen, F. O., "Fundamental Mechanisms of Cutting Front Formation in Laser Cutting", *SPIE*, vol. 2207, pp. 402-413.
Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.
Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.
Ortiz, Bias et al., Improved Bit Stability Reduces Downhole Harmonics (Vibrations), *International Association of Drilling Contractors/Society of Petroleum Engineers Inc.*, 1996, pp. 379-389.
Ouyang, L. B. et al., "General Single Phase Wellbore Flow Model", a report prepared for the COE/PETC, May 2, 1997, 51 pages.
Palashchenko, Yuri A., "Pure Roiling of Bit Cones Doubles Performance", *I & Gas Journal*, vol. 106, 2008, 8 pgs.
Palchaev, D. K. et al., "Thermal Expansion of Silicon Carbide Materials", *Journal of Engineering Physics and Thermophysics*, vol. 66, No. 6, 1994, 3 pages.
Pardoen, T. et al., "An extended model for void growth and Coalescence", *Journal of the Mechanics and Physics of Solids*, vol. 48, 2000, pp. 2467-2512.
Park, Un-Chul et al., "Thermal Analysis of Laser Drilling Processes", *IEEE Journal of Quantum Electronics*, 1972, vol. QK-8, No. 2, 1972, pp. 112-119.
Parker, R. et al., "Drilling Large Diameter Holes in Rocks Using Multiple Laser Beams (504)", while the date of the publication is unknown, it is believed to be prior to Aug. 19, 2009, 6 pages.
Parker, Richard A. et al., "Laser Drilling Effects of Beam Application Methods on Improving Rock Removal". *Society of Petroleum Engineers*, SPE 84353, 2003, pp. 1-7.
Patricio, M. et al., "Crack Propagation Analysis", while the date of the publication is unknown, it is believed to be prior to Aug. 19, 2009, 24 pages.
Pavlina, E. J. et al., "Correlation of Yield Strength and Tensile Strength with Hardness for Steels", *Journals of Materials Engineering and Performance*, vol. 17, No. 6, 2008, pp. 888-893.
Peebler, R. P. et al., "Formation Evaluation with Logs in the Deep Anadarko Basin", *SPE of AIME*, 1972, 15 pages.
Pepper, D. W. et al., "Benchmarking COMSOL Multiphysics 3.5a—CFD Problems", a presentation, Oct. 10, 2009, 54 pages.
Percussion Drilling Manual, by Smith Tools, 2002, 67 pgs.
Pettitt, R. et al., "Evolution of a Hybrid Roller Cone/PDC Core Bit", a paper prepared for Geothermal Resources Council 1980 Annual Meeting, Sep. 1980, 7 pages.
Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.
Ping, Cao et al., "Testing study of subcritical crack growth rate and fracture toughness in different rocks", *Transactions of NonferroMetals Society of China*, vol. 16, 2006, pp. 709-714.
Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

(56) References Cited

OTHER PUBLICATIONS

Plinninger, Ralf J. et al., "Predicting Tool Wear in Drill and Blast", *Tunnels & Tunneling International Magazine*, 2002, pp. 1-5.

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Polsky, Yarom et al., "Enhanced Geothermal Systems (EGS) Well Construction Technology Evaluation Report", *Sandia National Laboratories*, Sandia Report, SAND2008-7866, 2008, pp. 1-108.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.

Potyondy, D. O. et al., "A Bonded-particle model for rock", *International Journal of Rock Mechanics and Mining Sciences*, vol. 41, 2004, pp. 1329-1364.

Potyondy, D. O., "Simulating Stress Corrosion with a Bonded-Particle Model for Rock", *International Journal of Rock Mechanics & Mining Sciences*, vol. 44, 2007, pp. 677-691.

Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.

Powell, M. et al., "Optimization of UHP Waterjet Cutting Head, The Orifice", Flow International, while the date of the publication is unknown, it is believed to be prior to Aug. 19, 2009, 19 pages.

Price, R. H. et al., "Analysis of the Elastic and Strength Properties of Yuccs Mountain tuff, Nevada", 26th Symposium on Rock Mechanics, Jun. 1985, pp. 89-96.

Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.

Quinn, R. D. et al., "A Method for Calculating Transient Surface Temperatures and Surface Heating Rates for High-Speed Aircraft", NASA, Dec. 2000, 35 pages.

Radkte, Robert, "New High Strength and faster Drilling TSP Diamond Cutters", Report by *Technology International, Inc.*, DOE Award No. DE-FC26-97FT34368, 2006, 97 pgs.

Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

Rao, M. V. M. S. et al, "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Ravishankar, M. K., "Some Results on Search Complexity vs Accuracy", DARPA Spoken Systems Technology Workshop, Feb. 1997, 4 pages.

Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of IgneoRocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.

Rosler, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Rubin, A. M. et al., "Dynamic Tensile-Failure-Induced Velocity Deficits in Rock", *Geophysical Research Letters*, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Sano, Osam et al., "Acoustic Emission During Slow Crack Growth", *Department Mining and Mineral Engineering, NII-Electronic Library Service*, 1980, pp. 381-388.

Santarelii, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for The Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schormair, Nik et al., "The influence of anisotropy on hard rock drilling and cutting", *The Geological Society of London, IAEG*, Paper No. 491, 2006, pp. 1-11.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

(56) References Cited

OTHER PUBLICATIONS

Shannon, G. J. et al., "High power laser welding in hyperbaric gas and water environments", *Journal of Laser Applications*, vol. 9, 1997, pp. 129-136.
Shiraki, K. et al., "SBS Threshold of a Fiber with a Brillouin Frequency Shift Distribution", *Journal of Lightwave Technology*, vol. 14, No. 1, Jan. 1996, pp. 50-57.
Shuja, S. Z. et al., "Laser heating of semi-infinite solid with consecutive pulses: Influence of materaial properties on temperature field", *Optics & Laser Technology*, vol. 40, 2008, pp. 472-480.
Simple Drilling Methods, WEDC Loughborough University, United Kingdom, 1995, 4 pgs.
Singh, T. N. et al., "Prediction of Thermal Conductivity of Rock Through Physico-Mechanical Properties", *Building and Environment*, vol. 42, 2007, pp. 146-155.
Sinha, D., "Cantilever Drilling—Ushering a New Genre of Drilling", a paper prepared for presentation at the SPE/IADC Middle East Drilling Technology Conference and Exhibition, Oct. 2003, 6 pages.
Sinor, Å. et al., "Drag Bit Wear Model", *SPE Drilling Engineering*, Jun. 1989, pp. 128-136.
Smith, D., "Using Coupling Variables to Solve Compressible Flow, Multiphase Flow and Plasma Processing Problems", COMSOL Users Conference 2006, 38 pages.
Smith, E., "Crack Propagation at a Constant Crack Tip Stress Intensity Factor", *Int. Journal of Fracture*, vol. 16, 1980, pp. R215-R218.
Sneider, RM et al., "Rock Types, Depositional History, and Diangenetic Effects, Ivishak reservoir Prudhoe Bay Field", *SPE Reservoir Engineering*, Feb. 1997, pp. 23-30.
Soeder, D. J. et al., "Pore Geometry in High- and Low-Permeability Sandstones, Travis Peak Formation, East Texas", *SPE Formation Evaluation*, Dec. 1990, pp. 421-430.
Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.
Somerton, W. H. et al., "Thermal Expansion of Fluid Saturated Rocks Under Stress", SPWLA Twenty-Second Annual Logging Symposium. Jun. 1981, pp. 1-8.
Sousa, L. M. O. et al., "Influence of Microfractures and Porosity on the Physico-Mechanical Properties and Weathering of Ornamental Granites", *Engineering Geology*, vol. 77, 2005, pp. 153-168.
Stone, Charles M. et al., "Qualification of a Computer Program for Drill String Dynamics", *Sandia National Laboratories*, SAND-85-0633C, 1985, pp. 1-20.
Stowell, J. F. W., "Characterization of Opening-Mode Fracture Systems in the Austin Chalk", *Gulf Coast Association of Geological Societies Transactions*, vol. L1, 2001, pp. 313-320.
Straka, W. A. et al., "Cavitation Inception in Quiescent and Co-Flow Nozzle Jets", 9th International Conference on Hydrodynamics, Oct. 2010, pp. 813-819.
Suarez, M. C. et al., "COMSOL in a New Tensorial Formulation of Non-Isothermal Poroelasticity", publisher unknown, while the date of the publication is unknown, it is believed to be prior to Aug. 19, 2009,2 pages.
Summers, D. A., "Water Jet Cutting Related to Jet & Rock Properties", publisher unknown, while the date of the publication is unknown, it is believed to be prior to Aug. 19, 2009, 13 pages.
Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.
Takarli, Mokhfi et al., "Damage in granite under heating/cooling cycles and water freeze-thaw condition", *International Journal of Rock Mechanics and Mining Sciences*, vol. 45, 2008, pp. 1164-1175.
Tanaka, K. et al., "The Generalized Relationship Between the Parameters C and m of Paris' Law for Fatigue Crack Growth", *Scripta Metallurgica*, vol. 15, No. 3, 1981, pp. 259-264.
Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.
Tang, C. A. et al., "Coupled analysis of flow, stress and damage (FSD) in rock failure", *International Journal of Rock Mechanics and Mining Sciences*, vol. 39, 2002, pp. 477-489.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastracture Development in the Northern Regions, Jun. 2005, 7 pages.
Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.
Terzopoulos, D. et al., "Modeling Inelastic Deformation: Viscoelasticity, Plasticity, Fracture", *SIGGRAPH '88*, Aug. 1988, pp. 269-278.
Thomas, R. P., "Heat Flow Mapping at the Geysers Geothermal Field", published by the California Department of Conservation Division of Oil and Gas, 1986, 56 pages.
Thompson, G. D., "Effects of Formation Compressive Strength on Perforator Performance", a paper presented of the Southern District API Division of Production, Mar. 1962, pp. 191-197.
Thorsteinsson, Hildigunnur et al, "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.
Tovo, R. et al., "Fatigue Damage Evaluation on Mechanical Components Under Multiaxial Loadings", excerpt from the Proceedings of the COMSOL Conference, 2009, 8 pages.
Tuler, F. R. et al., "A Criterion for the Time Dependence of Dynamic Fracture", *The International Jopurnal of Fracture Mechanics*, vol. 4, No. 4, Dec. 1968, pp. 431-437.
Turner, D. et al., "New DC Motor for Downhole Drilling and Pumping Applications", a paper prepared for presentation at the SPE/ICoTA Coiled Tubing Roundtable, Mar. 2001, pp. 1-7.
Turner, D. R. et al., "The All Electric BHA; Recent Developments Toward an Intelligent Coiled-Tubing Drilling System", A paper prepared for presentation at the 1999 SPE/ICoTA Coiled Tubing Roundtable, May 1999, pp. 1-10.
Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.
U.S. Dept of Energy, "Chapter 6—Drilling Technology and Costs", from Report for The Future of Geothermal Energy, 2005, 53 pgs.
Udd, E. et al., "Fiber Optic Distributed Sensing Systems for Harsh Aerospace Environments", publisher unknown, while the date of the publication is unknown, it is believed to be prior to Aug. 19, 2009, 12 pages.
Valsangkar, A. J. et al., Stress-Strain Relationship for Empirical Equations of Creep in Rocks, *Engineering Geology*, Mar. 29, 1971, 5 pages.
Varnado, S. G. et al., "The Design and Use of Polycrystalline Diamond Compact Drag Bits in The Geothermal Environment", *Society of Petroleum Engineers of AIME*, SPE 8378, 1979, pp. 1-11.
Wagh, A. S. et al., "Dependence of Ceramic Fracture Properties on Porosity", *Journal of Material Sience*, vol. 28, 1993, pp. 3589-3593.
Wagner, F, et al., "The Laser Microjet Technology—10 Years of Development (M401)", publisher unknown, while the date of the publication is unknown, it is believed to be prior to Aug. 19, 2009, 9 pages.
Waldron, K. et al., "The Microstructures of Perthitic Alkali Feldspars Revealed by Hydroflouric Acid Etching", *Contributions to Mineralogy and Petrology*, vol. 116, 1994, pp. 360-364.
Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.
Wandera, C. et al., "Characterization of the Melt Removal Rate in Laser Cutting of Thick-Section Stainless Steel", *Journal of Laser Applications*, vol. 22, No. 2, May 2010, pp. 62-70.

(56) References Cited

OTHER PUBLICATIONS

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", *Computational Materials Science*, vol. 43, 2008, pp. 892-901.

Waples, D. W, et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

Wen-gui, Cao et al., "Damage constituitive model for strain-softening rock based on normal distribution and its parameter determination", *J. Cent. South Univ. Technol.*, vol. 14, No. 5, 2007, pp. 719-724.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Wiercigroch, M., "Dynamics of ultrasonic percussive drilling of hard rocks", *Journal of Sound and Vibration*, vol. 280, 2005, pp. 739-757.

Wilkinson, M. A. et al., "Experimental Measurement of Surface Temperatures During Flame-Jet Induced Thermal Spallation", *Rock Mechanics and Rock Engineering*, 1993, pp. 29-62.

Williams, R. E. et al., "Experiments in Thermal Spallation of VarioRocks", *Transactions of the ASME*, vol. 118, 1996, pp. 2-8.

Willis, David A. et al., "Heat transfer and phase change during picosecond laser ablation of nickel", *International Journal of Heat and Mass Transfer*, vol. 45, 2002, pp. 3911-3918.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of The Industrial Physicist at: http://www.aip.org/tip/INPHFA/vol-9/iss-3/p24.html, on May 18, 2010, pp. 1-5.

Wong, Teng-fong et al., "Microcrack statistics, Weibull distribution and micromechanicai modeling of compressive failure in rock", *Mechanics of Materials*, vol. 38, 2006, pp. 664-681.

Wood, Tom, "Dual Purpose COTD™ Rigs Establish New Operational Records", *Treme Coil Drilling Corp., Drilling Technology Without Borders*, 2009, pp. 1-18.

Wu, X. Y. et al., "The Effects of Thermal Softening and Heat Conductin on the Dynamic Growth of Voids", *International Journal of Solids and Structures*, vol. 40, 2003, pp. 4461-4478.

Xia, K. et al., "Effects of microstructures on dynamic compression of Barre granite", *International Journal of Rock Mechanics and Mining Sciences*, vol. 45, 2008. pp. 879-887, available at: www.sciencedirect.com.

Xiao, J. Q. et al., "Inverted S-Shaped Model for Nonlinear Fatigue Damage of Rock", *International Journal of Rock Mechanics & Mining Sciences*, vol. 46, 2009, pp. 643-648.

Xu, Z et al. "Modeling of Laser Spallation Drilling of Rocks fro gas- and Oilwell Drilling", *Society of Petroleum Engineers*, SPE 95746, 2005, pp. 1-6.

Xu, Z. et al., "Application of High Powered Lasers to Perforated Completions", *International Congress on Applications of Laser & Electro-Optics*, Oct. 2003, 6 pages.

Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.

Xu. Z. et al., "Laser Spallation of Rocks for Oil Well Drilling", Proceedings of the 23rd International Congress on Applications of Lasers and Electro-Optics, 2004, pp. 1-6.

Xu, Z. et al., "Rock Perforation by Pulsed Nd: YAG Laser", Proceedings of the 23rd International Congress on Applications of Lasers and Electro-Optics 2004, 2004, 5 pages.

Xu, Z. et al., "Specific Energy of Pulsed Laser Rock Drilling", *Journal of Laser Applications*, vol. 15, No. 1, Feb. 2003, pp. 25-30.

Xu, Z. et al., "Specific Energy for Laser Removal of Rocks", *Proceedings of the 20th International Congress on Applications of Lasers & Electro-Optics*, 2001, pp. 1-8.

Yabe, T. et al., "The Constrained Interpolation Profile Method for Multiphase Analysis", *Journal of Computational Physics*, vol. 169, 2001, pp. 556-593.

Yamamoto, K. Y. et al., "Detection of Metals in the Environment Using a Portable Laser-Induced Breakdown Spectroscopy Instrument", *Applied Spectroscopy*, vol. 50, No. 2, 1996, pp. 222-233.

Yamashita, Y, et al., "Underwater Laser Welding by 4kW CW YAG Laser", *Journal of Nuclear Science and Technology*, vol. 38, No. 10, Oct. 2001, pp. 891-895.

Yamshchikov, V. S. et al., "An Evaluation of The Microcrack Density of Rocks by Ultrasonic Velocimetric Method", *Moscow Mining Institute. (Translated from Fiziko-Tekhnicheskie Problemy Razrabotki Poleznykh Iskopaemykh)*, 1985, pp. 363-366.

Yasar, E. et al., "Determination of the Thermal Conductivity from Physico-Mechanical Properties", *Bull Eng. Geol. Environ.*, vol. 67, 2008, pp. 219-225.

Yilbas, B. S. et al., "Laser short pulse heating: Influence of pulse intensity on temperature and stress fields", *Applied Surface Science*, vol. 252, 2006, pp. 8428-8437.

Yilbas, B. S. et al., "Laser treatment of aluminum surface: Analysis of thermal stress field in the irradiated region", *Journal of Materials Processing Technology*, vol. 209, 2009, pp. 77-88.

Yilbas, B. S. et al., "Nano-second laser pulse heating and assisting gas jet considerations", *International Journal of Machine Tools & Manufacture*, vol. 40, 2000, pp. 1023-1038.

Yilbas, B. S. et al., "Repetitive laser pulse heating with a convective boundary condition at the surface", *Journal of Physics D: Applied Physics*, vol. 34, 2001, pp. 222-231.

York, J. L. et al., "The influence of Flashing and Cavitation on Spray Formation", a progress report for UMRI Project 2815 with Delavan Manufacturing Company, Oct. 1959, 27 pages.

Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.

Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.

Zehnder, A. T., "Lecture Notes on Fracture Mechanics", 2007, 227 pages.

Zeng, Z. W. et al., "Experimental Determination of Geomechanical and Petrophysical Properties of Jacklork Sandstone—A Tight Gas Formation", a paper prepared for the presentation at the 6th North

(56) References Cited

OTHER PUBLICATIONS

American Rock Mechanics Symposium (NARMS): *Rock Mechanics Across Borders and Disciplines*, Jun. 2004, 9 pages.
Zeuch, D.H. et al., "Rock Breakage Mechanism Wirt a PDC Cutter", *Society of Petroleum Engineers, 60th Annual Technical Conference*, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2, No. 3, 2008, pp. 253-260.
Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.
Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.
Zhou, T. et al., "Analysis of Stimulated Brillouin Scattering in Multi-Mode Fiber by Numerical Solution", *Journal of Zheisang University of Science*, vol. 4 No. 3, May-Jun. 2003, pp. 254-257.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.
Zhu, Dongming et al., "influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.
Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
Zhu, X. et al., "High-Power ZBLAN Glass Fiber Lasers: Review and Prospect", *Advances in OptoElectronics*, vol. 2010, pp. 1-23.
Zietz, J. et al., "Determinants of House Prices: A Quantile Regression Approach", *Department of Economics and Finance Working Paper Series*, May 2007, 27 pages.
Zuckerman, N. et al., "Jet Impingement Heat Transfer: Physics, Correlations, and Numerical Modeling", *Advances in Heat Transfer*, vol. 39, 2006, pp. 565-631.
A Built-for-Purpose Coiled Tubing Rig, by Schlumberger Wells, No. DE-PS26-03NT15474, 2006, 1 pg.
"Chapter I—Laser-Assisted Rock-Cutting Tests", publisher unknown, while the date of the publication is unknown, it is believed to be prior to Aug. 19, 2009, 64 pages.
"Chapter 7: Energy Conversion Systems—Options and Issues", publisher unknown, while the date of the publication is unknown, it is believed to be prior to Aug. 19, 2009, pp. 7-1 to 7-32 and table of contents page.
"Cross Process Innovations", Obtained from the Internet at: http://www.mrl.columbia.edu/ntm/CrossProcess/CrossProcessSect5.htm, on Feb. 2, 2010, 11 pages.
"Fourier Series, Generalized Functions. Laplace Transform", publisher unknown, while the date of the publication is unknown, it is believed to be prior to Aug. 19, 2009, 6 pages.
"Introduction to Optical Liquids", published by Cargille-Sacher Laboratories Inc., Obtained from the Internet at: http://www.cargille.com/opticalintro.shtml, on Dec. 23, 2008, 5 pages.
"Laser Drilling", Oil & Natural Gas Projects (Exploration & Production Technologies) Technical Paper, Dept. of Energy, Jul. 2007, 3 pages.
"Leaders in Industry Luncheon", IPAA & TIPRO, Jul. 8, 2009, 19 pages.
"Measurement and Control of Abrasive Water-Jet Velocity", publisher unknown, while the date of the publication is unknown, it is believed to be prior to Aug. 19, 2009, 8 pages.
"NonhomogeneoPDE~Heat Equation with a Forcing Term", a lecture, 2010, 6 pages.
"Performance Indicators for Geothermal Power Plants", prepared by International Geothermal Association for World Energy Council Working Group on Performance of Renewable Energy Plants, author unknown, Mar. 2011, 7 pages.
"Rock Mechanics and Rock Engineering", publisher unknown, while the date of the publication is unknown, it is believed to be prior to Aug. 19, 2009, 69 pages.
"Shock Tube", Cosmol MultiPhysics 3.5a, 2008, 5 pages.
"Silicone Fluids: Stable, Inert Media", Gelest, Inc., while the date of the publication is unknown, it is believed to be prior to Aug. 19, 2009, 27 pages.
"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.
"Underwater Laser Cutting", TWI Ltd, May/Jun. 2011, 2 pages.
Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2003, 73 pages.
Utility U.S. Appl. No. 13/800,933, filed Mar. 13, 2013, 73 pages.
Utility U.S. Appl. No. 13/849,831, filed Mar. 25, 2013, 83 pages.
Utility U.S. Appl. No. 13/852,719, filed Mar. 28, 2013, 85 pages.

* cited by examiner

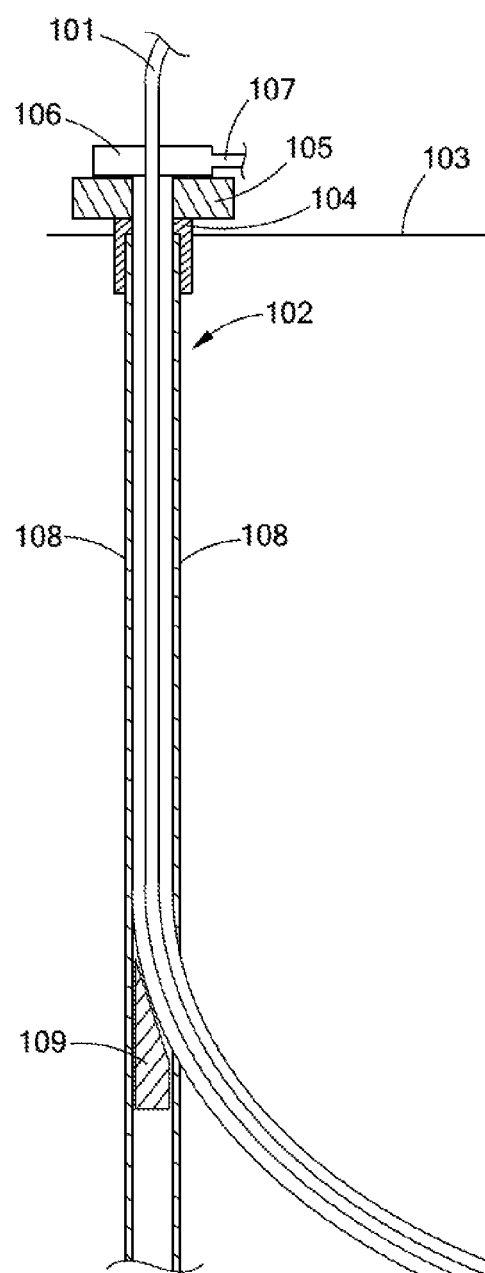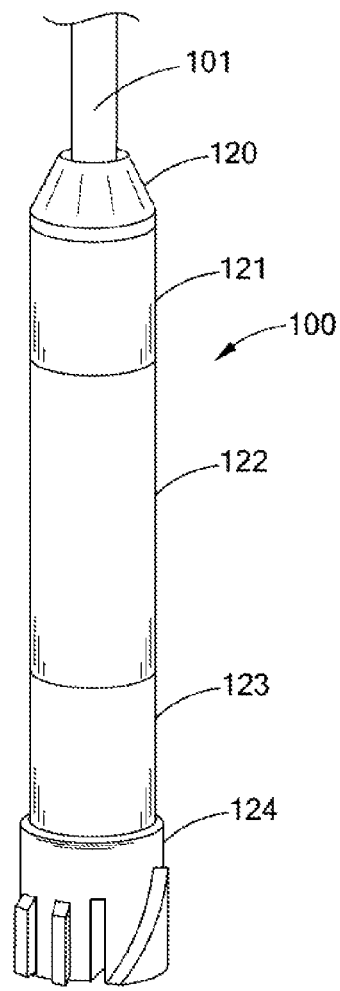
Fig. 1
Fig. 1A

ELECTRIC MOTOR FOR LASER-MECHANICAL DRILLING

This application: (i) is a continuation of U.S. patent application Ser. No. 13/403,287 filed Feb. 23, 2012, which will issue as U.S. Pat. No. 9,074,422 and which claims, under 35 U.S.C. §119(e)(1), the benefit of the filing date of Feb. 24, 2011 of U.S. provisional application Ser. No. 61/446,042, claims, under 35 U.S.C. §119(e)(1), the benefit of the filing date of Feb. 24, 2011 of U.S. provisional application Ser. No. 61/446,043, claims, under 35 U.S.C. §119(e)(1), the benefit of the filing date of Feb. 24, 2011 of U.S. provisional application Ser. No. 61/446,040, claims, under 35 U.S.C. §119(e)(1), the benefit of the filing date of Feb. 24, 2011 of U.S. provisional application Ser. No. 61/446,312, and which is a continuation-in-part of U.S. patent application Ser. No. 13/210,581 filed Aug. 16, 2011, now issued as U.S. Pat. No. 8,662,160, the entire disclosures of each of which are incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to electric motors for use down hole in laser-mechanical drilling and to high power laser drilling systems.

As used herein, unless specified otherwise "high power laser energy" means a laser beam having at least about 1 kW (kilowatt) of power. As used herein, unless specified otherwise "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein, unless specified otherwise, the term "substantial power transmission" means at least about 50% transmittance.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, rhyolite, quartzite and shale rock.

As used herein, unless specified otherwise, the term "borehole" should be given it broadest possible meaning and includes any opening that is created in a material, a work piece, a surface, the earth, a structure (e.g., building, protected military installation, nuclear plant, offshore platform, or ship), or in a structure in the ground, (e.g., foundation, roadway, airstrip, cave or subterranean structure) that is substantially longer than it is wide, such as a well, a well bore, a well hole, a micro hole, slimhole, a perforation and other terms commonly used or known in the arts to define these types of narrow long passages. Wells would further include exploratory, production, abandoned, reentered, reworked, and injection wells. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°, i.e., horizontal and greater than 90° e.g., such as a heel and toe and combinations of these such as for example "U" and "Y" shapes. Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages and combinations thereof, in a situation where multiple boreholes are connected or interconnected each borehole would have a borehole bottom. Boreholes may be formed in the sea floor, under bodies of water, on land, in ice formations, or in other locations and settings.

Boreholes are generally formed and advanced by using mechanical drilling equipment having a rotating drilling tool, e.g., a bit. For example and in general, when creating a borehole in the earth, a drilling bit is extending to and into the earth and rotated to create a hole in the earth. In general, to perform the drilling operation the bit must be forced against the material to be removed with a sufficient force to exceed the shear strength, compressive strength or combinations thereof, of that material. Thus, in conventional drilling activity mechanical forces exceeding these strengths of the rock or earth must be applied. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

As used herein, unless specified otherwise, the term "advancing" a borehole should be given its broadest possible meaning and includes increasing the length of the borehole. Thus, by advancing a borehole, provided the orientation is not horizontal, e.g., less than 90° the depth of the borehole may also be increased. The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the terms "ream", "reaming", a borehole, or similar such terms, should be given their broadest possible meaning and includes any activity performed on the sides of a borehole, such as, e.g., smoothing, increasing the diameter of the borehole, removing materials from the sides of the borehole, such as e.g., waxes or filter cakes, and under-reaming.

As used herein, unless specified otherwise, the terms "drill bit", "bit", "drilling bit" or similar such terms, should be given their broadest possible meaning and include all tools designed or intended to create a borehole in an object, a material, a work piece, a surface, the earth or a structure including structures within the earth, and would include bits used in the oil, gas and geothermal arts, such as fixed cutter and roller cone bits, as well as, other types of bits, such as, rotary shoe, drag-type, fishtail, adamantine, single and multi-toothed, cone, reaming cone, reaming, self-cleaning, disc, three-cone, rolling cutter, crossroller, jet, core, impreg and hammer bits, and combinations and variations of the these.

In general, in a fixed cutter bit there are no moving parts. In these bits drilling occurs when the entire bit is rotated by, for example, a rotating drill string, a mud motor, or other means to turn the bit. Fixed cutter bits have cutters that are attached to the bit. These cutters mechanically remove material, advancing the borehole as the bit is turned. The cutters in fixed cutter bits can be made from materials such as polycrystalline diamond compact ("PDC"), grit hot-pressed inserts ("GHI"), and other materials known to the art or later developed by the art.

In general, a roller cone bit has one, two, three or more generally conically shaped members, e.g., the roller cones, that are connected to the bit body and which can rotate with respect to the bit. Thus, as the bit is turned, and the cones contact the bottom of a borehole, the cones rotate and in effect roll around the bottom of the borehole. In general, the cones have, for example, tungsten carbide inserts ("TCI") or milled teeth ("MT"), which contact the bottom, or other surface, of the borehole to mechanically remove material and advance the borehole as the bit it turned.

In both roller cone, fixed bits, and other types of mechanical drilling the state of the art, and the teachings and direction of the art, provide that to advance a borehole great force should be used to push the bit against the bottom of the borehole as the bit is rotated. This force is referred to as weight-on-bit ("WOB"). Typically, tens of thousands of pounds WOB are used to advance a borehole using a mechanical drilling process.

Mechanical bits cut rock by applying crushing (compressive) and/or shear stresses created by rotating a cutting surface against the rock and placing a large amount of WOB. In the case of a PDC bit this action is primarily by shear stresses and in the case of roller cone bits this action is primarily by crushing (compression) and shearing stresses. For example, the WOB applied to an 8¾" PDC bit may be up to 15,000 lbs, and the WOB applied to an 8¾" roller cone bit may be up to 60,000 lbs. When mechanical bits are used for drilling hard and ultra-hard rock excessive WOB, rapid bit wear, and long tripping times result in an effective drilling rate that is essentially economically unviable. The effective drilling rate is based upon the total time necessary to complete the borehole and, for example, would include time spent tripping in and out of the borehole, as well as, the time for repairing or replacing damaged and worn bits.

As used herein, unless specified otherwise, the term "drill pipe" should be given its broadest possible meaning and includes all forms of pipe used for drilling activities; and refers to a single section or piece of pipe, as well as, multiple pipes or sections. As used herein, unless specified otherwise, the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein, unless specified otherwise, the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein, unless specified otherwise, the term "tubular" should be given its broadest possible meaning and includes drill pipe, casing, riser, coiled tube, composite tube, vacuum insulated tubing ("VIT"), production tubing and any similar structures having at least one channel therein that are, or could be used, in the drilling industry. As used herein the term "joint" should be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of tubular is the thickness of the material between the internal diameter of the tubular and the external diameter of the tubular.

As used herein the term "line structure" should be given its broadest meaning, unless specifically stated otherwise, and would include without limitation: wire line; coiled tubing; slick line; logging cable; cable structures used for completion, workover, drilling, seismic, sensing, and logging; cable structures used for subsea completion and other subsea activities; umbilicals; cables structures used for scale removal, wax removal, pipe cleaning, casing cleaning, cleaning of other tubulars; cables used for ROV control power and data transmission; lines structures made from steel, wire and composite materials, such as carbon fiber, wire and mesh; line structures used for monitoring and evaluating pipeline and boreholes; and would include without limitation such structures as Power & Data Composite Coiled Tubing (PDT-COIL) and structures such as Smart Pipe® and FLATpak®.

As used herein, unless specified otherwise the terms "blowout preventer," "BOP," and "BOP stack" should be given their broadest possible meaning, and include: (i) devices positioned at or near the borehole surface, e.g., the surface of the earth including dry land or the seafloor, which are used to contain or manage pressures or flows associated with a borehole; (ii) devices for containing or managing pressures or flows in a borehole that are associated with a subsea riser or a connector; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise the term "fixed platform," would include any structure that has at least a portion of its weight supported by the seafloor. Fixed platforms would include structures such as: free-standing caissons, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water a top of vertical support members that extend down in to the water to the seafloor. Fixed platforms may have a single vertical support, or multiple vertical supports, e.g., pylons, legs, etc., such as a three, four, or more support members, which may be made from steel, such as large hollow tubular structures, concrete, such as concrete reinforced with metal such as rebar, and combinations of these. These vertical support members are joined together by horizontal and other support members. In a piled-jacket platform the jacket is a derrick-like structure having hollow essentially vertical members near its bottom. Piles extend out from these hollow bottom members into the seabed to anchor the platform to the seabed.

SUMMARY

There has been a long standing need for down hole tools, bottom hole assemblies, and drilling systems that utilize a down hole electric motor as the source for rotational movement of the drilling bit and conveyance of a high power laser beam there through, as well as, a drilling system that can advance a borehole with reduced weight on bit when compared to conventional drilling technology. The present inventions, among other things, solve these and other needs by providing the articles of manufacture, devices and processes taught herein.

There is provided a high power laser electric motor assembly including: a first section associated with a second section; the second section rotationally associated with a third section; the first section including a means for receiving a high power laser beam, a means for collimating the laser beam, and a first fluid cavity; the second section including an inner cavity and a second fluid cavity; a laser beam path extending through the inner cavity, in this manner the laser beam path is in collimated space; and, the third section including an optics assembly, and a third fluid cavity; a first rotary sealing means associating the first and second sections; a second rotary sealing means associating the second and the third sections; in this manner, the means for collimating the laser beam, the second section inner cavity and the third section optics assembly are in optical communication, and in this manner the first fluid cavity, the second fluid cavity and the third fluid cavity are in fluid communication.

Further, there are provided high power laser electric motor assemblies and systems that may also include: the second section having an electric motor; the electric motor having a hollow rotor defining the inner cavity; the inner cavity being in fluid isolation from the second cavity; the second cavity being formed between a rotor and a stator; the inner cavity partially defined by a beam path tube; the inner cavity defined by a beam path tube; the first, the second or the third section have an electric motor; an electric motor having a hollow rotor defining the beam path tube; the means for receiving the high power laser beam is in optical communication with a high power optical laser fiber that is in optical communication with a high power laser beam source; the means for receiving the high power laser beam is in optical communication with a conveyance structure that is in optical communication with a high power laser beam source having greater than about 5 kW of power; the means for receiving the high power laser beam is in optical communication with a conveyance structure that is in optical communication with a high power laser beam source having greater than about 10 kW of power; the means for receiving the high power laser beam is in optical communication with a conveyance structure that is in optical communication with a high power laser beam source having greater than about 80 kW of power; the means for receiving the high power laser beam is in optical communication with a high power optical laser fiber that is in optical communication with a high power laser beam source having greater than about 20 kW of power; the means for receiving the high power laser beam is in optical communication with a high power optical laser fiber that is in optical communication with a high power laser beam source having greater than about 60 kW of power; the means for receiving the high power laser beam is in optical communication with a high power optical laser fiber that is in optical communication with a high power laser beam source having greater than about 100 kW of power; the means for receiving the high power laser beam is in optical communication with a high power optical laser fiber that is in optical communication with a high power laser beam source, and in this manner the high power laser beam source has a plurality of high power lasers; the means for receiving the high power laser beam is in optical communication with a high power optical laser fiber that is in optical communication with a high power laser beam source having greater than about 60 kW of power, and in this manner the high power laser beam source has a plurality of high power lasers; the means for receiving the high power laser beam is in optical communication with a high power optical laser fiber that is in optical communication with a high power laser beam source having greater than about 80 kW of power, and in this manner the high power laser beam source has a plurality of high power lasers; and the electric motor being a permanent magnet motor.

Still further, there is provided a high power laser electric motor assembly including: a first section associated with a second section; the second section rotationally associated with a third section; the first section including a means for receiving a high power laser beam, a means for collimating the laser beam, and a first fluid cavity; the second section including an inner cavity and a second fluid cavity; a laser beam path extending through the inner cavity, in this manner the laser beam path is in collimated space; and, the third section including an optics assembly, and a third fluid cavity; a first rotary sealing means associating the first and second sections; a second rotary sealing means associating the second and the third sections; in this manner, the means for collimating the laser beam, the second section inner cavity and the third section optics assembly are in optical communication, and in this manner the first fluid cavity, the second fluid cavity and the third fluid cavity are in fluid communication, in which the second section has a rare earth permanent magnet motor an electric.

Furthermore, there is provided a high power laser electric motor assembly including: a first section associated with a second section; the second section rotationally associated with a third section; the first section including a means for receiving a high power laser beam, a means for collimating the laser beam, and a first fluid cavity; the second section including an inner cavity and a second fluid cavity; a laser beam path extending through the inner cavity, in this manner the laser beam path is in collimated space; and, the third section including an optics assembly, and a third fluid cavity; a first rotary sealing means associating the first and second sections; a second rotary sealing means associating the second and the third sections; in this manner, the means for collimating the laser beam, the second section inner cavity and the third section optics assembly are in optical communication, and in this manner the first fluid cavity, the second fluid cavity and the third fluid cavity are in fluid communication, in which the second section has a rare earth permanent magnet motor an electric having a hollow rotor defining the inner cavity Yet still further, there are provided high power laser electric motor assemblies and systems that may also include: a bent sub and a means for transmitting the high power laser beam across the bent sub; a tractor; a bent sub having an optical wedge assembly; a laser beam path in the hollow rotor in collimated space; a laser beam path in the hollow rotor is in free space; the conveyance structure having three high power optical fibers; the conveyance structure has four high power optical fibers; a laser source capable of providing a laser beam having a power of at least about 90 kW and the conveyance structure has five high power optical fibers; and a bent sub and a means for transmitting the high power laser beam across the bent sub.

Additionally, there is provided an electric motor laser bottom hole assembly drilling system including: a high power laser source, having the capability to provide a laser beam having a power of greater than about 50 kW; an electrical power source; a conveyance structure; an electric motor bottom hole assembly; the conveyance structure optically associating the laser source and the electric motor bottom hole assembly, and the conveyance structure electrically associating the electrical power source and the electric motor bottom hole assembly; the electric motor bottom hole assembly including: an electric motor having a hollow rotor, and a laser-mechanical bit; and, a laser beam path extending through the hollow rotor, thus the laser beam from the laser source is transmitted through the hollow rotor to a laser-mechanical bit.

Still additionally, there is provided an electric motor laser bottom hole assembly drilling system including: a high power laser source, having the capability to provide a laser beam having a power of greater than about 50 kW; an electrical power source; a conveyance structure; an electric motor bottom hole assembly; the conveyance structure optically associating the laser source and the electric motor bottom hole assembly, and the conveyance structure electrically associating the electrical power source and the electric motor bottom hole assembly; the electric motor bottom hole assembly including: a first optical package, a second optical package, an electric motor having a hollow rotor, and a laser-mechanical bit, in this manner the first optical package has a collimating optic; a beam path tube partially within the hollow rotor and optically and sealingly associating the first optics package and the second optics package; the second optical package optically associated with the laser-mechanic bit; and, a laser beam path extending through the beam path tube, thus the laser beam from the laser source is transmitted through the beam path tube in collimated space to the second optical package and to the laser-mechanical bit.

Further, there is provided a system for performing high power laser operations including: a high power laser source; the high power laser in optical association with a high power laser fiber; the high power laser fiber in optical communication with a first optical package in an electric motor laser bottom hole assembly; the first optical package in optical communication with a second optical package and defining a laser beam path between the first and second optical packages; and, the laser beam path being at least partly located within a section of the electric motor where rotation takes place upon operation of the motor.

Still further, there is provided a method of laser-mechanical directional drilling including: providing an electric motor laser bottom hole assembly system to a borehole at a borehole site, the system including an electric motor laser bottom hole assembly and a high power laser source, the electric motor bottom hole assembly including a pair of optical wedges; lowering the laser bottom hole assembly into the borehole; configuring the optical wedges to define an angled laser beam path; delivering a high power laser beam having at least about 20 kW to the electrical motor laser bottom hole assembly, in this manner the high power laser beam is transmitted through the configured optical wedges; in this manner the angled beam path correlates with a directional drilling path and thus the borehole is advanced along the directional drilling path.

Moreover, there is also provided a method of advancing a borehole by: providing a system for performing high power laser operations including: a high power laser source; the high power laser in optical association with a high power laser fiber; the high power laser fiber in optical communication with a first optical package in an electric motor laser bottom hole assembly; the first optical package in optical communication with a second optical package and defining a laser beam path between the first and second optical packages; and, the laser beam path being at least partly located within a section of the electric motor where rotation takes place upon operation of the motor; lowering the system into a borehole and rotating the electric motor while propagating a laser beam through the electric motor bottom hole assembly to thereby advance the borehole.

BRIEF DESCRIPTION OF THE DRAWINGS

FIG. 1 is a schematic view of an embodiment of an electric motor laser bottom hole assembly ("EM-LBHA") system in accordance with the present invention.

FIG. 1A is an enlarged view of the electric motor laser bottom hole assembly of FIG. 1.

DESCRIPTION OF THE PREFERRED EMBODIMENTS

Figure 2:
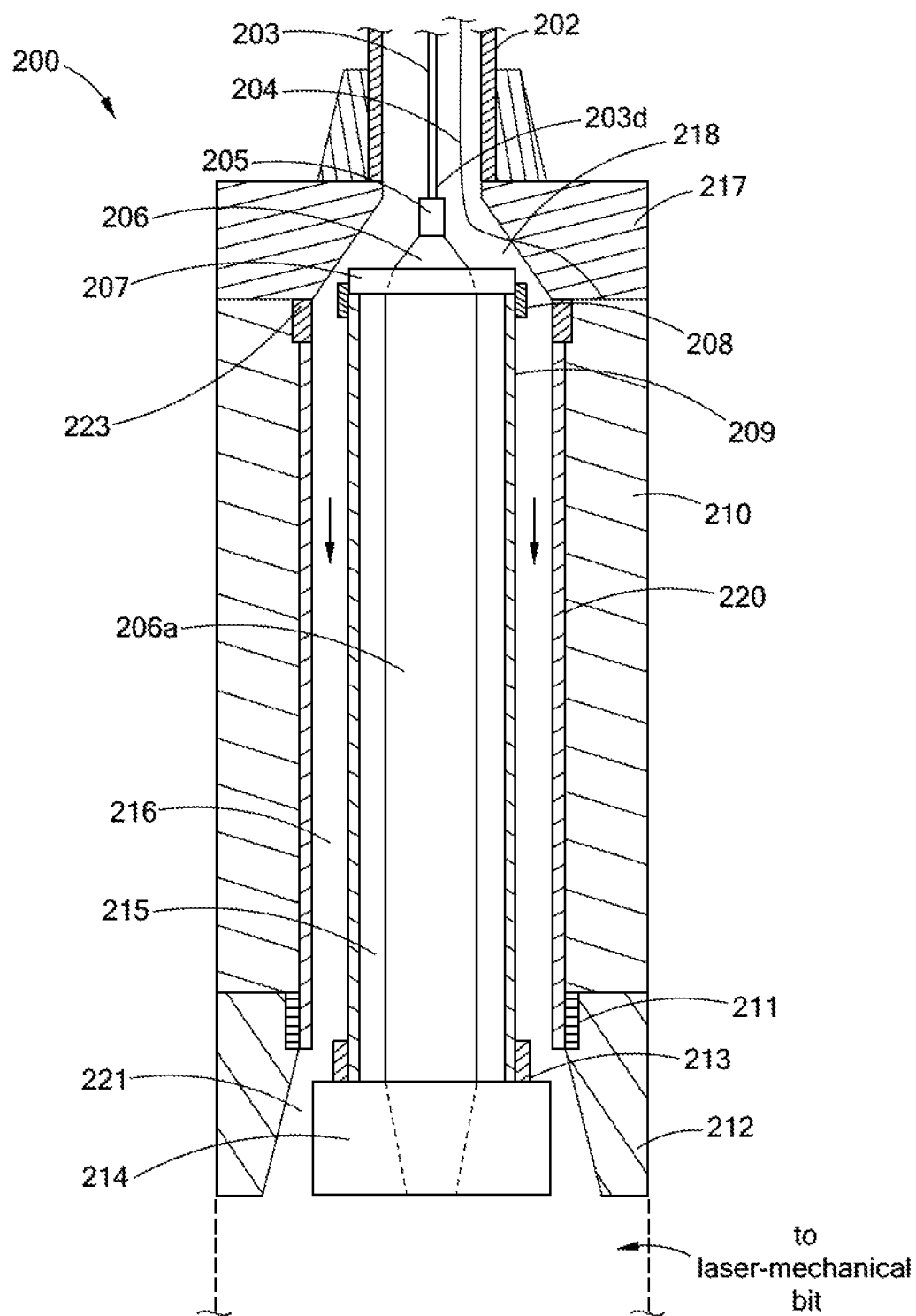
FIG. 2 is a cross-sectional view of an embodiment of an EM-LBHA in accordance with the present invention.

The present inventions relate to downhole electric motor assemblies and systems for use with laser-mechanical bits and to laser-mechanical drilling systems.

Turning to FIG. 1 there is shown a borehole 102 having a well head 104, a BOP 105 and a diverter 106, or other assembly to maintain pressure and handle the return of drilling fluids to the surface 103. Conveyance structure 101, which may be a line structure, is shown extending into the borehole 102 and down to and being connected with an embodiment of an electric motor laser bottom hole assembly (EM-LBHA) 100. There is also a whipstock 109 and casing 108 in the borehole, and the borehole has been advanced in a primarily horizontal direction from the general location of the whipstock 109 in the borehole 108. The conveyance structure 101 would be connected to a drilling unit, workover and completion unit, or similar type of unit and laser assembly (not shown in this drawing).

FIG. 1A shows a more detailed view of the EM-LBHA 100 and sets forth the general components that that may make up an EM-LBHA. It being recognized that additional general components may be added or used and that, applying the teachings of this specification, the order and arrangement of these components may be varied, without departing from the spirit of the inventions.

In FIG. 1A, the EM-LBHA 100 has a conveyance structure 101 in mechanical, and fluid communication with an upper motor section 121 by way of a conveyance structure connector 120. The upper motor section 121 is connected to the motor section 122, below the motor section is a lower motor section 123, and below the lower motor section 123 is a laser-mechanical bit 124.

In general, and by way of example, the upper section of the EM-LBHA may contain a flow passage, and flow regulator and control devices, for a fluid that is transported down a channel associated with the conveyance structure. The conveyance structure, preferably is a line structure, which may have multiple channels for transporting different materials, cables, or lines to the EM-LBHA and the borehole. The channels may be in, on, integral with, releasably connected to, or otherwise associated with the line structure, and combinations and variations of these. Further examples of conveyance structures are disclosed and taught in the following US patents and US Patent Application Publications: Publication No. US 2010/0044106, now issued as U.S. Pat. No. 8,511,401, Publication No. 2010/0215326, Publication No. 2012/0020631, now issued as U.S. Pat. No. 8,571,368, Ser. No. 13/210,581, now issued as U.S. Pat. No. 8,662,160, and Ser. No. 61/493,174. The fluid may be a gas, a foam, a supercritical fluid, or a liquid. The fluid may be used to cool the high power optics in the EM-LBHA, to cool the motor, to cool other sections, to keep the laser beam path clear of debris, to remove or assist in removing cuttings and other material from the borehole, the bottom of the borehole or the work area, and other uses for downhole fluids known to the art. Typically, a liquid may be used to cool the electric motor components.

The upper section of the EM-LBHA may further have an optical package, which may contain optical elements, optics and be a part of an optical assembly, a means to retain the end of the high power optical fiber(s), and an optical fiber connector(s) for launching the beam(s) from the fiber into the optical assembly, which connector could range from a bare fiber face to a more complex connector. High power laser connectors known to those of skill in the art may be utilized. Further, examples of connectors are disclosed and taught in the following U.S. Patent Application Ser. No. 61/493,174, the entire disclosure of which is incorporated herein by reference. The upper section of the EM-LBHA may further have electrical cable management means to handle and position the electrical cable(s), which among other uses, are for providing electric power to the motor section. These electric cable(s) may be contained within, or otherwise associated with, the conveyance structure.

The upper section of the EM-LBHA also may contain handling means for managing any other cables, conduits, conductors, or fibers that are needed to support the operation of the EM-LBHA. Examples of such cables, conduits, conductors, or fibers would be for connection to, or association with: a sensor, a break detector, a LWD (logging while drilling assembly), a MWD (measuring while drilling assembly), an RSS (rotary steerable system), a video camera, or other section, assembly component or device that may be included in, or with, the EM-LBHA.

In general, the motor section can be any electric motor that is capable, or is made capable of withstanding the conditions and demands found in a borehole, during drilling, and as a result of the drilling process. The electric motor has a hollow rotating drive shaft, i.e., a hollow rotor, or should be capable of accommodating such a hollow rotor. By way of example, an electronic submersible pump ("ESP") may be used, or adapted to be used as a motor section for a EM-LBHA.

The general, the lower section contains an optical package, which may contain optical elements, optics and be a part of an optical assembly, for receiving and shaping and directing the laser beam into a particular pattern. The upper section optical package and the lower section optical package may form, or constitute, an optics assembly. The lower section optical package, in part, launches (e.g., propagates, shoots) the beam into a beam path or beam channel within the drill bit so that the beam can strike the bottom (and/or side) of the borehole without damaging the bit. The lower section may also contain equipment, assemblies and systems that are capable of, for example, logging, measuring, videoing, sensing, monitoring, reaming, or steering. Additional lower sections may be added to the EM-LBHA, that may contain equipment, assemblies and systems that are capable of, for example, logging, measuring, videoing, sensing, monitoring, reaming, or steering.

In general, the laser-mechanical bit that is utilized with an electric motor, EM-LBHA or a laser drilling system, may be any mechanical drill bit, such as a fixed cutter bit or a roller cone bit that has been modified to accommodate a laser beam, by providing a laser beam path, or is associated with a laser beam and/or optics package. Further examples of laser-mechanical bits, their usage, and the laser-mechanical drilling process are disclosed and taught in the following US Patent Applications and US Patent Application Publications: US 2010/0044106, now issued as U.S. Pat. No. 8,511,401, US 2010/0044105, now issued as U.S. Pat. No. 8,424,617, US 2010/0044104, now issued as U.S. Pat. No. 8,820,434, US 2010/0044103, now issued as U.S. Pat. No. 8,826,973, US 2010/0044102 now issued as U.S. Pat. No. 8,636,085, Ser. No. 13/211,729, Ser. No. 12/896,021, now issued as U.S. Pat. No. 8,627,901, Ser. No. 61/446,043, Ser. No. 61/446,041, Ser. No. 61/446,312, US 2012/0261188 and US 2012/0255774, the entire disclosure of each of which are incorporated herein by reference.

In general, an optical assembly, an optical package, an optical component and an optic, that is utilized with an electric motor, EM-LBHA, or a laser drilling system, may be generally any type of optical element and/or system that is capable of handling the laser beam (e.g., transmitting, reflecting, etc. without being damaged or quickly destroyed by the beams energy), that is capable of meeting the environmental conditions of use (e.g., down hole temperatures, pressures, vibrates, etc.) and that is capable of effecting the laser beam in a predetermined manner (e.g., focus, de-focus, shape, collimate, steer, scan, etc.). Further examples of optical assemblies, optical packages, optical components and optics are disclosed and taught in the following US Patent Applications and US Patent Application Publications: US 2010/0044105, now issued as U.S. Pat. No. 8,424,617, US 2010/0044104, now issued as U.S. Pat. No. 8,820,434, US 2010/0044103, now issued as U.S. Pat. No. 8,826,973, Ser. No. 61/446,040, Ser. No. 61/446,312 and US 2012/0275159, the entire disclosure of each of which are incorporated herein by reference.

Turning to FIG. 2 there is shown a cross-section view of an embodiment of an EM-LBHA. Thus, there is provided an EM-LBHA 200 having an upper section 217, a motor section 210, and a lower section 212.

The upper section 217 has a channel 218, which may be annular. Channel 218 is in fluid communication with the conveyance structure 202 and motor channel 216, which may be annular. The upper section 217 also may house, or contain, the distal end 203d of the optical fiber 203, a connector 205 and optical package 207. The laser beam 206 in FIG. 2 is being launched from (e.g., propagated) from connector 205 into optical package 207. In operation, a high power laser (not shown) generates a high power laser beam that is coupled (e.g., launched into) the proximal end (not shown) of the high power optical fiber 203. The high power laser beam is transmitted down the optical fiber 203 and is launched from the distal end 203d of the optical fiber 203, into a connector 205, and/or into the optical package 207. The laser beam travels along path 206 as it is launched into the optical package 207. The laser beam leaves, is launched from, the optical package 207 and travels along beam path 206a through an electric motor beam channel 215 to optical package 214.

In the embodiment of FIG. 2, a connector 205 is used, it being understood that a fiber face or other manner of launching a high power laser beam from a fiber into an optical element or system may also be used. The optical package 207, in this embodiment of FIG. 2, includes collimating optics; and as such, the laser beam traveling along beam path 206a through the electric motor beam channel 215 is collimated, this beam path 206a may also be referred to as collimated space. In this manner, the electric motor beam channel 215 is in, coincides with, collimated space.

The optical package 214 may be beam shaping optics, as for example are provided in the above incorporated by reference patent applications, or it may contain optics and/or a connector for transmitting the beam into another high power fiber, for example for transmitting the beam through additional lower section and/or over greater lengths.

The construction of the motor section preferable should take into consideration the tolerances of the various components of the electric motor when operating and under various external and internal conditions, as they relate to the optical assemblies, beam path and the transmission of the laser beam through the electric motor. Preferably, these tolerances are very tight, so that variations in the electric motor will not adversely, detrimentally, or substantially adversely, affect the transmission of the laser beam through the electric motor. Further, the optical assemblies, including the optical packages, optics, and optical elements and systems and related fixtures, mounts and housing, should take into consideration the electric motor tolerances, and may be constructed to compensate for, or otherwise address and mitigate, higher electric motor tolerances than may otherwise be preferably desirable.

The first optical package 207 and the second optician package 214, constitute and optical assembly, and should remain in alignment with respect to each other during operation, preferably principally in all three axes. Axial tolerances, e.g., changes in the length of the motor, i.e., the z axis, when the optical assembly, or the electric motor beam path channel, encompass collimated space, as is the case with the FIG. 2 embodiment, may be larger than tolerances in the x,y axis and tolerances for tilt along the x,y axis, without detrimentally effecting the transmission of the laser beam through the electric motor. Thus, preferably a centralization means, such as a centralizer, a structural member, etc., can be employed with to the optical package 214. Thus, it is preferable that the motor section 210 be stiff, i.e., provide very little bending. Additionally, the length of the motor section in which the optical packages and the optical assembly are associated, may be limited by the distance over which the laser beam, e.g., 206a, can travel within the beam path channel 215.

The motor 210 has a beam path channel 215, which is contained within a beam path tube 209. The beam path tube 209 is mechanically and preferably sealing associated with the optical package 207 by attachment means 208, and with optical package 214 by attachment means 213. The beam path tube 209 may rotate, e.g., move with the rotation of the rotor 220, be fixed to, with, the optical package 207 and thus not rotate, or be rotatable but not driven by, or not directly mechanically driven by the rotor 220.

Preferably, when using a fluid that is not transmissive or substantially not transmissive to the laser beam, or that may have contamination, e.g., oils or dirt, which could foul or harm an optical element, a beam path tube may be utilized. The beam path tube isolates, or separates, the beam path channel, and thus the laser beam and associated optical elements, from such a laser incompatible fluid. Additionally, flow channels through, around, or entering after, the non-rotating components of the motor section may be used, to provide the fluid to the drill bit, or other components below the motor section, while at the same time preventing that fluid from harming, or otherwise adversely effecting the laser beam path and its associated optical elements.

The attachment means 213 and 208 may be any suitable attachment device for the particular configuration of beam path tube, e.g., rotating, fixed, rotatable. Thus, various arrangements of seals, bearings and fittings, known to those of skill in the motor and pump arts may be employed. A further consideration, and preferably, is that the attachment means also provides for a sealing means to protect the beam path channel 215 from contamination, dirt and debris, etc, both from the fluid as well as from the attachment means itself. The faces of the optic elements of the optical packages 214, 207, as well as, the interior of the beam path channel 215 should be kept as free from dirt and debris as is possible, as the present of such material has the potential to heat up, attach to, or otherwise damage the optic when a high power laser beam is used, or propagated through them.

The motor 210 has a rotor 220 that is hollow along its length, and has a rotor channel 216. The rotor channel 216 is in collimated space. The rotor channel 216 is in fluid communication with the upper section channel 218 and the lower section channel 221. During operation the rotor 220 is rotated, and thus rotates the lower section 212 and whatever additional section(s) are mechanically connected to the lower section, such as for example a bit. The rotor, and/or the motor section are attached to the upper and lower section by way of attachment means 211 and 223. Thus, various arrangements of seals, bearings and fittings, known to those of skill in the motor and pump arts may be employed. Further connecting, attachment and sealing means may be employed between the various sections of the EM-LBHA to meet the pressure, temperature and other down hole conditions and environments. Thus, various arrangements of seals, bearings and fittings, known to those of skill in the motor and pump arts may be employed.

By way of example, in a preferred mode of operation electric power from line 204 is provided to the motor 210, which causes rotor 220 to rotate. The exterior of motor 210 does not rotate. A fluid transported down hole by the conveyance structure 202 flows from the conveyance structure through the first section channel 218, into the rotor channel 216 and into the lower section channel 221 and on to other channels, ports, nozzles, etc. for its intended use(s). The optical package 214 is mechanically fixed with the rotating portions of the lower section 212, and thus, is rotated, either directly or indirectly, by the rotor 220. For example, the optics may be attached to the lower section by way of spoke-like members extending across channel 221.

The motor may also be configured such that it operates as an inside-out motor, having the exterior of motor 210 rotate and the rotor 220 remain stationary. In this situation a corresponding connection for the non-rotation rotor 220 to the conveyance structure, which also is non-rotating, may be employed.

In determining the size of the various channels, the flow requirements for the particular use of the EM-LBHA must be considered. These requirements should also be balanced against the laser power requirements and the size of the beam that will be launched between the non-rotating portions of the EM-LBHA, e.g., 217, 207 and the rotating portions, e.g., 212, 214.

In the embodiment shown in FIG. 2, the preferred transitional zone between rotation and non-rotating optical components of the optical assembly is the motor section 210. In this section the beams travel through free space, i.e., not within a fiber or waveguide, and further the free space is collimated space. Collimated space for this transitional zone is preferred; non-collimated space, e.g., defocus, use of an imaging plane, etc., may be also be utilized. A fiber could also be used to convey the laser beam between the rotation and non-rotating components. In this case an optical slip ring type of assembly would be employed, in the rotating or non-rotating sections or between those sections. Examples of such an optical slip ring device for use in association with the electric motor are disclosed and taught in the following U.S. Patent Application Ser. No. 61/446,040 and US Patent Application Publication 2012/0275159, the entire disclosures of each of which are incorporated herein by reference. Thus, and preferably, the EM-LBHA is configured such that along its length there is a section wherein an exterior section is not rotating, an interior section is rotating and the laser beam is in free space at least partially within that section.

Although the components of each section, and each section of the device are shown in the drawings as being completely contained within each section and/or having a clear line of demarcation, such distinctions are only for the purpose of illustration. Thus, it is contemplated that the various sections may have some overlap, that the components of the various section may extend from one section into the next, or may be located or contained entirely within the next or another section.

In general, the laser-mechanical drilling process, even when advancing the borehole through hard and very hard rock formations, e.g., 25 ksi (thousand pounds per square inch) and greater, very low WOB, and torque may be needed. Thus, the reactive torque from the rotation of the bit may be managed by the conveyance structure. If for some reason, it was determined that high(er) WOB and/or torque(s) were needed, or for sum other reason it is viewed as undesirable to have some or all of the reactive torque managed by the conveyance structure, stabilizers and/or anchor type devices could be added to the outer sides of the motor section and/or upper section, which would engage the sides of the borehole, preventing and/or reducing the tendency of that section to rotate in response to the forces created by the bits' rotational engagement with the borehole surface.

Additionally, gearboxes may be used in embodiments of an EM-LBHA. The gearboxes may be included, as part of the motor section, or may be added to the assembly as a separate section and may include a passage for an optical fiber and or a beam path channel. In addition to the use of a gearbox multiple motor sections may be utilized. Thus, the motors may be stacked, in a modular fashion one, above, or below the other. Electrical power and the high power laser optics may be feed through the central hollow shafts if the stack of motors, for example. Additionally, an "inside out", e.g., the outside of the motor rotates and the inside hollow shaft remains stationary, motors may be used, in conjunction with a traditional motor. In this manner creating a stack of alternating conventional and inside out motor sections, which a fiber and/or free space beam channel going through the stack.

Further, although use with a line structure, or other continuous type of tube is preferred as the conveyance structure, the motor sections and/or the EM-LBHA can be used with jointed pipe (to lower and raise the EM-LBHA and to added additional rotational force if needed) and/or with casing, (e.g., for casing while drilling operations).

Figure 3:
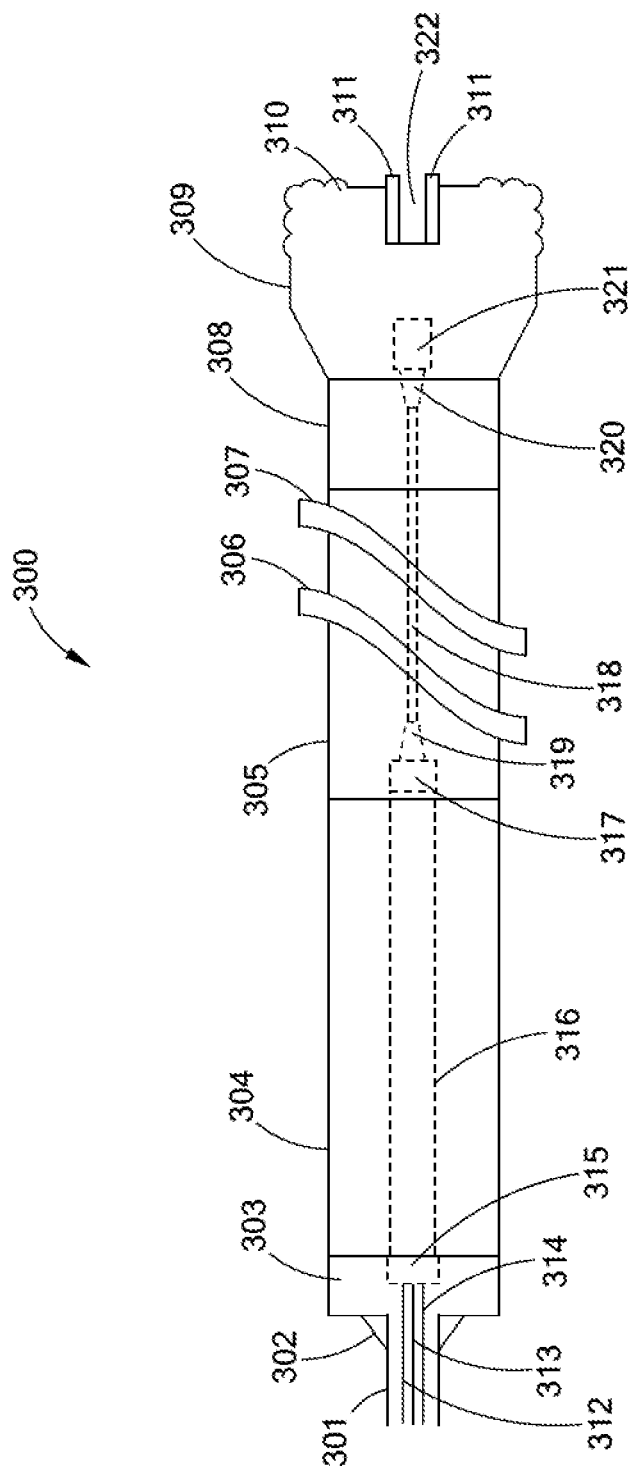
FIG. 3 is a schematic view of an embodiment of an EM-LBHA in accordance with the present invention.

Turning to FIG. 3 there is provided an embodiment of an EM-LBHA having a tractor section. Thus, there is shown an EM-LBHA 300 having an upper section 303, a motor section 304, a first lower section, which is a tractor section 305, a second lower section 308, and a bit section 309. There is also shown a conveyance structure connector 302 and conveyance structure 301. The conveyance structure may be any suitable line structure or tubular as described above. The relationship and placement of the optical assemblies and optical paths, with respect to the motor sections is shown by phantom lines. Thus, three high power optical fibers 312, 313, 314, (one, two, three, four, five or more fibers may be utilized, with each fiber transmitting a laser beam having about 10 kW, about 15 kW, about 20 kW and greater powers), which were contained within, or otherwise associated with, conveyance structure 301, are optically associated to an optical package 315. The laser beam path, and the laser beam when the laser is fired, travels through a beam path channel that is formed by beam path tube 316. Beam path tube 316 connects to optical package 317, which connects to a connector 319, which in turn connects to an optical fiber(s) 318. Fiber(s) 318 travel through, are contained within, tractor section 205, and then are optically associated with connector 320, which in turn is optically connected to optical package 321. The laser beam is shaped and focused to a desired and predetermined pattern by the optical package and launched from the associated optical elements, which could for example be a window, toward the surface of the borehole. In this manner the laser beam would travel from the optical package 321 through a channel within the bit, exiting through a beam slit 322, which in this embodiment is framed by beam path blades 311. In this embodiment the bit would utilize PDC cutters, e.g., 310.

Tractor section 305 has external blades 306, 307 these blades are configured around the exterior of the section 305, such they engage the side wall of the borehole and when rotated in one direction, (which is also the direction of rotation for the bit to drill) they advance, drive, the EM-LBHA forward, i.e., in a direction toward the bottom of the borehole. Similarly, when the blades 306, 307 are rotated in the other direction they move the EM-LBHA back, up, or away from the bottom of the borehole.

In the embodiment of FIG. 3 is noted that preferably optical components, 317, 319, 318, 320, and 321 rotate with the sections 305, 308, 309. Thus, the transition for non-rotating optical components to rotating optical components takes place within the motor section 304 and at least partially within the free space of a beam path channel. Embodiments of EM-LBHA where this transition occurs at other locations are contemplated. For example, an optical fiber could be extended through the motor section 304, and the first lower section 305, where in would enter an optical slip ring type assembly, which would be associated with the rotating optics 321, in the bit section. Still further, those rotating optics 321 could be located in section 308 and the length of the channel in the bit for transmitting the laser beam through the bit increased.

Figure 6:
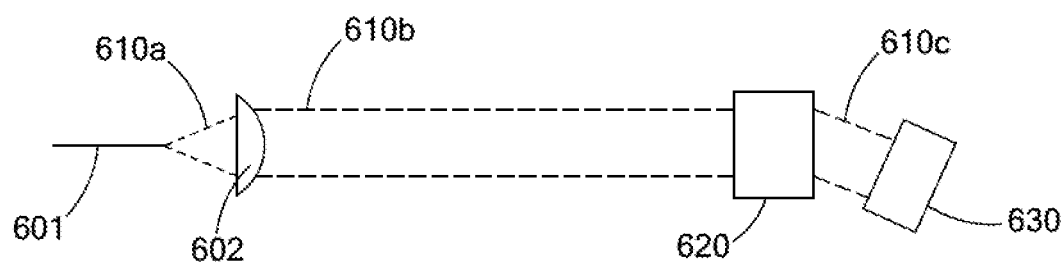
FIGS. 6, 6A and 6B are schematic views of an embodiment of beam paths and wedges for use in a bent sub configuration in accordance with the present invention.
Figure 6A:
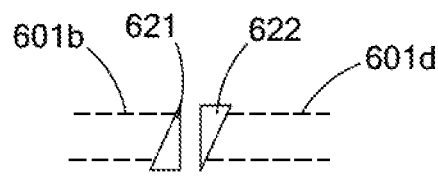
Figure 6B:
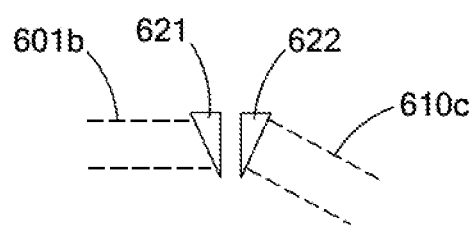

Turning to FIGS. 6, 6A and 6B there are shown schematics of the beam paths and optical components for a bent sub in association with an EM-LBHA. A fiber 601 launches a laser beam along beam path 610*a* into a collimating optic 602. The laser beam exits collimating optic 602 and travels along beam path 610*b*, which is in collimated space and enters steering collar 620. The beam exits steering color 620 and travels along beam path 610*c*, which is in collimated space, and at an angle to beam path 610*b*, and enters optics 630 that are rotating in the bent section of the bent sub. The steering collar 620 contains a beam steering assembly that has two wedges 621 and 622. These wedges, or at least one of these wedges are movable with respect to each other. Thus, as shown in FIG. 6A, the wedges 621, 622 are positioned to provide for a straight, coaxial propagation of the laser beam along beam path 610*d*. As shown in FIG. 6B the wedges 620, 621 are configured to provide for an angled propagation of the laser beam, that would be utilized for example during direction drilling with a bent sub. In this manner the wedge, or wedges can be configured, positioned or adjusted to direct a collimated laser beam along a beam path that follows the shape of a bent sub or directional drilling assembly. In this manner the optical wedge(s) may be adjusted in parallel with, or in concert with, the mechanical wedges, or other mechanical means for determining the angle of the bend for the bent sub. Further, connectors, optics and fibers may be associated with the wedge assemblies to transmit the laser beam further, over greater lengths, before or after the mechanical bend in the assembly.

The following table sets forth exemplary characteristics for an EM-LBHA, and in particular exemplary features of an embodiment(s) of the motor section of an EM-LBHA.

| General Exemplary Performance Criteria and Characteristics | |
| --- | --- |
| Motor Type | Permanent Magnet Synchronous motor |
| Motor Back-EMF | To Suit Drive |
| Mode of operation | Continuous (Powered from a motor drive to constant speed) |
| Orientation | Generally vertical but investigate effect of horizontal operation (primarily on shaft life) 45-65 from vertical |
| Pole Number | 4 |
| Outside Diameter | 3.80" (96.52 mm) Maximum. |
| Inside Diameter of Shaft bore | Largest possible diameter subject to maximum torque; preferably about 1.125" |
| Active Length | Target Output = 50 kW/meter. |
| Motor Cooling | Oil - Sealed Heat exchange to pump assembly walls (typically, liquid drilling fluid) |
| Thrust Load | 80 kN (300 kW system) |
| Control Mode | Sensorless |
| Rotation | CW and ACW |
| Input | |
| Configuration | 3 phase motor drive |
| Voltage | 3500 V for 300 kW unit |
| Current | 100 amps |
| Frequency | 120 Hz |
| Supply Voltage Profile | Sinewave |
| dv/dt Excitation | 5 kV/us |
| Supply Cable | 1500 to 2500 meters |
| Output | |
| Ambient Temperature | 176 C. Expected (240 C. maximum) |
| Storage Temperature | −40 C. to +65 C. |
| Pressure | 5000 psi |
| Corrosion Resistance | H2S and CO2 Protection |
| Motor input | Over-current protection on drive |
| Stator Temperature | RTD Sensor |
| Design Life | |
| Service | >40,000 hours External Flow |
| Production | 6000 bpd for 300 kW 3000 bpd (min) for 300 kW |

Further the motor section of the EM-LBHA may be made utilizing an ESP or down hole motor have permanent magnets made from rare earth materials. This permanent magnet motor may have its rotor shaft modified to provide a channel in the rotor, i.e., a hollow rotor, for passage of an optical fiber, or free space laser beam transmission.

Figure 4:
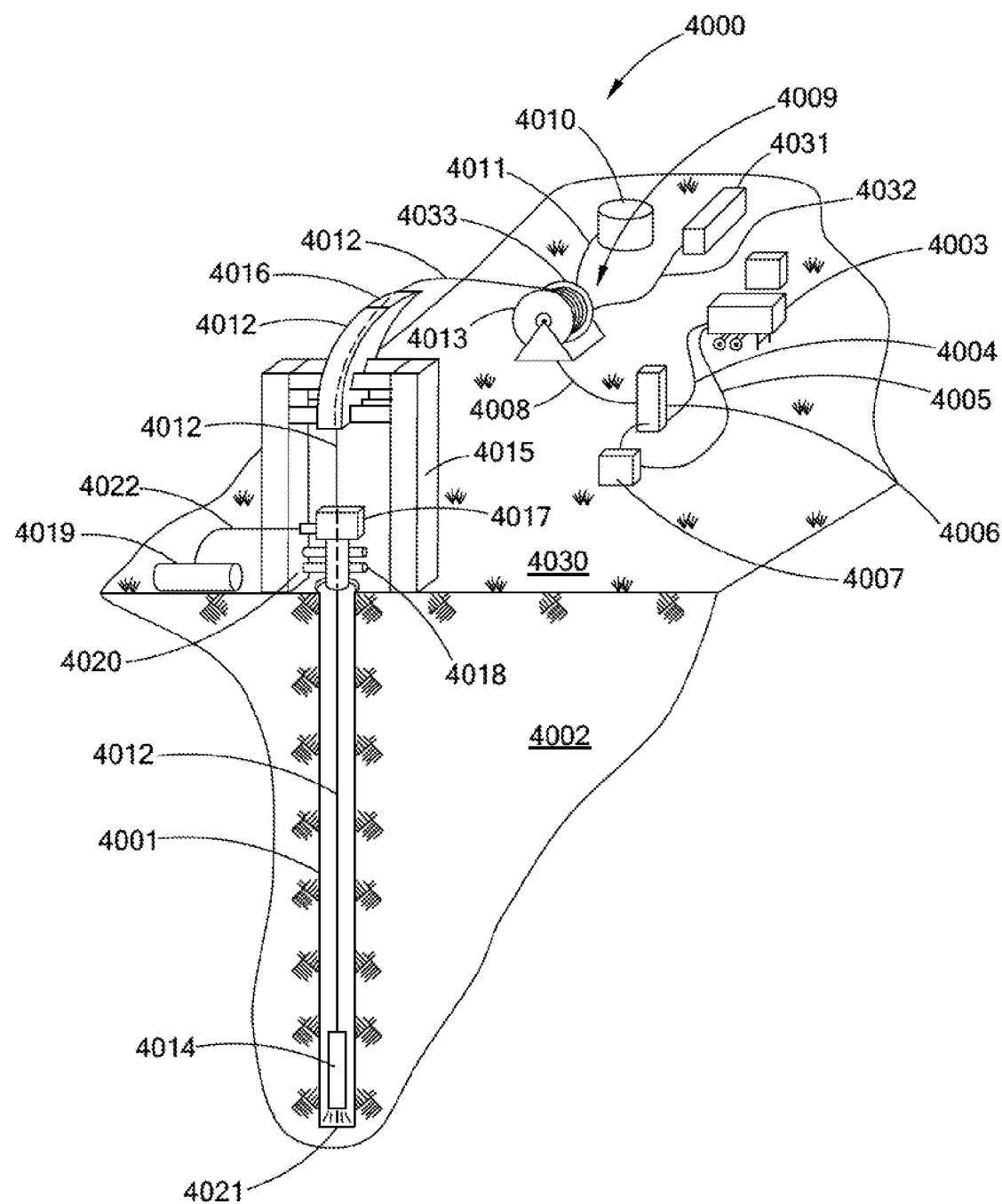
FIG. 4 is a schematic view on an embodiment of an EM-LBHA system in accordance with the present invention.

In FIG. 4 there is provided an embodiment of a high power laser drilling workover and completion system as deployed in the field for conducting drilling operations, using a LBHA, that is powered by an electric motor. The EM-LBHA is powered by an electrical power source 4031 using a power cable 4032. A control system as disclosed and taught in the following U.S. Patent Application Ser. No. 61/446,412, and Ser. No. 13/403,692, the entire disclosures of each of which are incorporated herein by reference, may be used with this system. The control system may be expanded, or networked with other control systems, to provide an integrated control network for some, or all of the components disclosed in that deployment. Thus, the laser drilling system 4000 is shown as deployed in the field in relation to the surface of the earth 4030 and a borehole 4001 in the earth 4002. There is also an electric power source 4003, e.g. a generator, electric cables 4004, 4005, a laser 4006, a chiller 4007, a laser beam transmission means, e.g., an optical fiber, optical cable, or conveyance device 4008, a spool or real 4009 for the conveyance device, a source of working fluid 4010, a pipe 4011 to convey the working fluid, a down hole conveyance device 4012, a rotating optical transition device 4013, a high power laser tool 4014, a support structure 4015, e.g., a derrick, mast, crane, or tower, a handler 4016 for the tool and down hole conveyance device, e.g., an injector, a diverter 4017, a BOP 4018, a system to handle waste 4019, a well head 4020, a bottom 4021 of the borehole 4001, a connector 4022, an electrical slip ring 4033.

In addition to the injector, gravity, pressure, fluids, differential pressure, buoyancy, a movable packer arrangement, and tractors, other motive means may be used to advance the EM-LBHA to its location of operation, such as for example to a predetermined location in a borehole, for example, the bottom of the borehole so that it may be laser-mechanically drilled to drill and advance the borehole.

Figure 5:
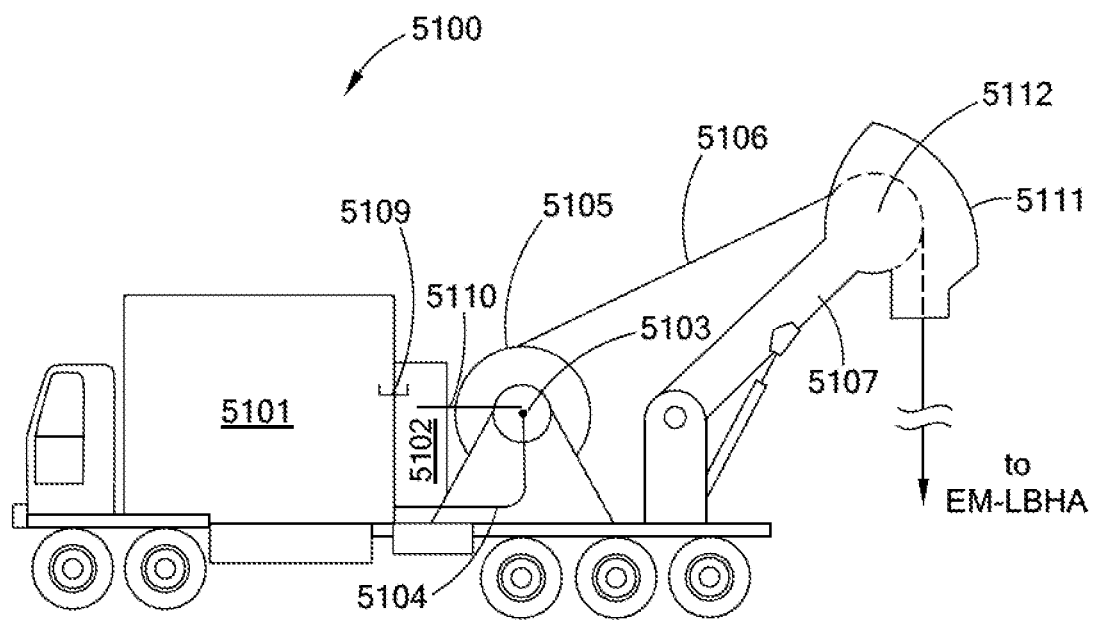
FIG. 5 is a schematic view of an embodiment of a mobile EM-LBHA unit in accordance with the present invention.

In FIG. 5 there is provided an embodiment of a mobile high power laser beam delivery system 5100 for use with an EM-LBHA for advancing boreholes. In the embodiment there is shown a laser room 5101. The laser room 5101 houses a 60 kW source of laser energy, which may be one, two, three or more fiber lasers, a chiller (or chiller interface, so that the larger heat exchanger and management section of the chiller unit can be located outside of the laser room either), a source of electrical power 5102, and a laser system controller, which is preferably capable of being integrated with a control system for the EM-LBHA. One, two or several, high power fiber(s) 5104 leaves the laser room 5101 and enters an electrical slip ring/optical slip ring assembly 5103, (for the purposes of illustration both the high power optical fiber(s) 5104 and the electrical power line 5110 are shown going into the same side of the spool 5105; it is noted that the fiber and the electrical line could connect on different or opposites sides of the spool). There is also shown an electrical line to power the lasers 5109. (It being understood that a separate generator, not on the truck may be employed, and in some configurations may be preferable to reduce or eliminate vibration, noise, and to reduce the overall foot print or area of the laser unit 5100.) The conveyance structure 5106, e.g. a composite tube having electrical lines and optical fibers built into its wall is wound around spool 5105. Within the electrical/optical slip ring the laser beam is transmitted from a non-rotating optical fiber to the rotating optical fiber that is contained within the conveyance device 5106 that is wrapped around spool 5105. Similarly, the electricity from electric power line 5110 is transferred by the electrical slip ring to the electric power lines in conveyance device 5106.

The conveyance device 5106 is associated with injector 5111 for advancing and retrieving the conveyance device, which injector is associated with a handling device 5107. Within the injector 5111 there is a path of travel 5112 that has a minimum radius of curvature when the conveyance device 5106 is run through the injector 5111. This minimum radius should be such as to reduce or eliminate bending losses to the laser beam energy. When determining the size of the minimum radius, the spool, or other conveyance device handling devices care should be taken to avoid unnecessary bending losses to the optical fiber associated with the conveyance device.

The conveyance device should have at least one high power optical fiber, may have an electric power source for the electric motor and may have additional fibers, as well as, other conduits, cables etc. for providing and receiving material, data, instructions to and from the electric motor bottom hole assembly, optics and/or bit. Although this system is shown as truck mounted, it is recognized the system could be mounded on or in other mobile or moveable platforms, such as a skid, a shipping container, a boat, a barge, a rail car, a drilling rig, a work boat, a work over rig, a work over truck, a drill ship, or it could be permanently installed at a location.

In general, and by way of example a laser room may contain a high power beam switch, a high power laser source (which could be a number of lasers, a single laser, or laser modules, collectively having at least about 5 kW, 10 kW, 20 kW, 30 kW 40 kW, 70 kW or more power), a chiller or a connection to a chiller assembly for the laser unit and a control counsel that preferably is in control communication with a control system and network. Examples of control systems and networks are disclosed and taught in the following U.S. Patent Application Ser. No. 61/446,412, Ser. No. 13/403,692, the entire disclosures of each of which are incorporated herein by reference. The controller may also be in communication with a first spool of high power laser cable, a second spool of high power laser cable and a third spool of high power laser cable, etc. Preferably, the larger comments of the chiller, such as the heat exchanger components, will be located outside of the laser room, both for space, noise and heat management purposes. In higher power systems, e.g., greater than 20 kW the use of multiple fibers and other multiple component type systems may be employed. These will, among other things provide greater safety and reliability to such higher power systems. The optical fiber in the conveyance device is then capable of being attached to a high power EM-LBHA, optics and/or bit. Electrical power can be supplied from the location where the laser room is located, from the mobile unit that transported the laser room, from separate generators, separate mobile generators, or other sources of electricity at the work site or bought to the work site. Separate or the same sources of electric for the laser and the EM-LBHA may be employed, depending upon, such factors as cost, availability power requirements, type of power needed etc.

When using a conveyance structure that is made from a composite material, an injector may not be required in some applications. Thus the EM-LBHA may be advanced by its own weight, the weight of drill collars, or a tractor section from a reel and retrieved by winding the composite tubing back onto the reel.

Further embodiments and teachings regarding high power optical fiber cable, fibers and the systems and components for delivering high power laser energy over great distances from the laser to a remote location for use by a tool are disclosed and set forth in detail in the following US Patent Applications and US Patent Application Publications: US 2010/0044106, now issued as U.S. Pat. No. 8,511,401, US 2010/0044104, now issues as U.S. Pat. No. 8,820,434, 2010/0044103, now issued as U.S. Pat. No. 8,826,973, US 2010/0215326, US 2012/0020631, now issued as U.S. Pat. No. 8,571,368 and Ser. No. 13/210,581, now issued as U.S. Pat. No. 8,662,160, the entire disclosures of each of which are incorporated herein by reference. These embodiments may be used in conjunction with an EM-LBHA and electric motor laser drilling systems set forth in and contemplated by this specification.

One or more high power optical fibers, as well as, lower power optical fibers may be used or contained in a single cable that connects the tool to the laser system, this connecting cable could also be referred to herein as a tether, an umbilical, wire line, or a line structure. The optical fibers may be very thin on the order of hundreds of μm (microns), e.g., greater than about 100 μm. These high power optical fibers have the capability to transmit high power laser energy having many kW of power (e.g., 5 kW, 10 kW, 20 kW, 50 kW or more) over many thousands of feet, e.g., over 1,000 ft, over about 2,000 ft, over about 5,000 ft, over about 10,000 ft and greater. The high power optical fibers further provides the ability, in a single fiber, although multiple fibers may also be employed, to convey high power laser energy to the tool, convey control signals to the tool, and convey back from the tool control information and data (including video data). In this manner the high power optical fiber has the ability to perform, in a single very thin, less than for example 1000 μm diameter fiber, the functions of transmitting high power laser energy for activities to the tool, transmitting and receiving control information with the tool and transmitting from the tool data and other information (data could also be transmitted down the optical cable to the tool). As used herein the term "control information" is to be given its broadest meaning possible and would include all types of communication to and from the laser tool, system or equipment.

The laser systems of the present invention may utilize a single high power laser, or they may have two or three high power lasers, or more. The high power laser beam, or beams, may have 10 kW, 20 kW, 40 kW, 80 kW or more power; and have a wavelength in the range of from about 445 nm (nanometers) to about 2100 nm, preferably in the range of from about 800 to 1900 nm, and more preferably in the ranges of from about 1530 nm to 1600 nm, from about 1060 nm to 1080 nm, and from about 1800 nm to 1900 nm. Further, the types of laser beams and sources for providing a high power laser beam may be the devices, systems, optical fibers and beam shaping and delivery optics that are disclosed and taught in the following US Patent Applications and US Patent Application Publications: Publication No. US 2010/0044106, now issued as U.S. Pat. No. 8,511,401, Publication No. US 2010/0044105, now issued as U.S. Pat. No. 8,424,617, Publication No. US 2010/0044103, now issued as U.S. Pat. No. 8,826,973, Publication No. US 2010/0044102, now issued as U.S. Pat. No. 8,636,085, Publication No. US 2010/0215326, Publication No. 2012/0020631, now issued as U.S. Pat. No. 8,571,368, Ser. No. 13/210,581 now issued as U.S. Pat. No. 8,662,160, and Ser. No. 61/493,174, the entire disclosures of each of which are incorporated herein by reference. The high power lasers for example may be fiber lasers or semiconductor lasers having 10 kW, 20 kW, 50 kW or more power and, which emit laser beams with wavelengths preferably in about the 1064 nm range, about the 1070 nm range, about the 1360 nm range, about the 1455 nm range, about the 1550 nm range, about the 1070 nm range, about the 1083 nm range, or about the 1900 nm range (wavelengths in the range of 1900 nm may be provided by Thulium lasers). Thus, by way of example, there is contemplated the use of four, five, or six, 20 kW lasers to provide a laser beam in a bit having a power greater than about 60 kW, greater than about 70 kW, greater than about 80 kW, greater than about 90 kW and greater than about 100 kW. One laser may also be envisioned to provide these higher laser powers. By way of example, there is also contemplated the use of a 10 kW laser, the use of a 20 kW, the use of a 40 kW laser, as a laser source to provide a laser beam having a power of from about 5 kW to about 40 kW, greater than about 8 kW, greater than about 18 kW, and greater than about 38 kW at the work location, or location where the laser processing or laser activities, are to take place.

High powered optical cables, spools of cables, creels, and reels of cables of the type disclosed and taught in the following US Patent Applications and US Patent Application Publications: 2010/0044104 (now issued as U.S. Pat. No. 8,820,434), 2010/0044103 (now issued as U.S. Pat. No. 8,826,973), 2010/0215326, 2012/0020631 (now issued as U.S. Pat. No. 8,571,368), Ser. No. 13/366,882, and Ser. No. 13/210,581 (now issued as U.S. Pat. No. 8,662,160), the entire disclosures of each of which are incorporated herein by reference, may be used in conjunction with the present systems. Thus, the conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have other optical or metal fiber for the transmission of data and control information and signals; it may be any of the combinations set forth in the forgoing patents and combinations thereof.

By way of example, in a high power laser system a controller may be in communication, via a network, cables fiber or other type of factory, marine or industrial data and control signal communication medium with the laser tool and potentially other systems at a work site. The controller may also be in communication with a first spool of high power laser cable, a second spool of high power laser cable and a third spool of high power laser cable, etc.

The components, systems and operations provided in the various figures and embodiments set froth in this specification may be used with each other and the scope of protection afforded the present inventions should not be limited to a particular embodiment, configuration or arrangement that is set forth in a particular example or a particular embodiment in a particular Figure.

Many other uses for the present inventions may be developed or released and thus the scope of the present inventions is not limited to the foregoing examples of uses and applications. Thus, for example, in addition to the forgoing examples and embodiments, the implementation of the present inventions may also be utilized in laser systems for hole openers, perforators, reamers, whipstocks, and other types of boring tools.

The present inventions may be embodied in other forms than those specifically disclosed herein without departing from its spirit or essential characteristics. The described embodiments are to be considered in all respects only as illustrative and not restrictive.

What is claimed is:

1. A method of performing a laser operation, the method comprising:
   a. locating an electric laser tool assembly at a work area for perform a laser operation in the work area;
   b. the electric laser tool assembly having: an electric motor; a first section attached with a second section; the second section rotationally attached with a third section; a collimator; a first fluid cavity; the second section comprising an inner optical cavity and a second fluid cavity; the third section comprising an optics assembly, and a third fluid cavity; a first rotary seal sealing the first and second sections; a second rotary seal sealing the second and the third sections;
   c. transmitting a high power laser beam along a laser beam path extending through the inner optical cavity of the second section, wherein the laser beam is collimated;
   d. transmitting a high power laser beam along a laser beam path within the electric laser tool assembly, the laser beam path extending through the collimator, the first section, the inner optical cavity of the second section and the optics assembly of the third section; whereby a collimated laser beam is transmitted through the optical cavity;
   e. transmitting a fluid through the first fluid cavity, the second fluid cavity and the third fluid cavity;
   f. delivering the laser beam and the fluid from the electric laser tool assembly to the work area;

g. rotating at least one of the sections; and, h. performing a laser operation in the work area.

2. The method of claim 1, wherein the laser beam has a wavelength of at least 445 nm to 2100 nm.

3. The method of claim 1, wherein the laser beam has a wavelength of 445 nm to 1060 nm.

4. The method of claim 1, wherein the laser beam is provided by a semiconductor lasers.

5. The method of claim 1, wherein the laser operation is drilling a borehole.

6. A method of for performing a laser operation on a work surface, the method comprising:
    a. locating an electric laser tool assembly at a work area adjacent a work surface for perform a laser operation in the work area;
    b. the electric laser tool assembly having: an electric motor; a first section attached with a second section; the second section rotationally attached with a third section; a collimator; a first fluid cavity; the second section comprising an inner optical cavity and a second fluid cavity; the third section comprising an optics assembly, and a third fluid cavity; a first rotary seal sealing the first and second sections; a second rotary seal sealing the second and the third sections;
    c. transmitting a high power laser beam along a laser beam path extending through the inner optical cavity of the second section, wherein the laser beam is collimated;
    d. transmitting a high power laser beam along a laser beam path within the electric laser tool assembly, the laser beam path extending through the collimator, the first section, the inner optical cavity of the second section and the optics assembly of the third section; whereby a collimated laser beam is transmitted through the optical cavity;
    e. transmitting a fluid through the first fluid cavity, the second fluid cavity and the third fluid cavity;
    f. delivering the laser beam and the fluid from the electric laser tool assembly to the work area;
    g. rotating at least one of the sections; and,
    h. performing a laser operation on the work surface.

7. The method of claim 6, wherein the laser beam has a wavelength of 445 nm to 1060 nm.

8. The method of claim 6, wherein the laser beam is provided by a semiconductor lasers.

9. The method of claim 6, wherein the work surface is a tubular located in a borehole.

10. A method of performing a laser operation, the method comprising:
    a. providing an electric laser tool assembly system to a work area at a borehole site, the system comprising an electric laser tool assembly assembly and a high power laser source, the electric laser tool assembly comprising a pair of optical wedges;
    b. locating the electric laser tool assembly in the work area;
    c. configuring the optical wedges to define an angled laser beam path;
    d. transmitting a high power laser beam through the electrical laser tool assembly, whereby the high power laser beam exits a first optical wedge of the configured optical wedges, transmits along the angled laser beam path in a collimated space, enters a second optical wedge of the configured optical wedges, and exits the second optical wedge; and,
    e. delivering the laser beam to the work area for performing a laser operation in the work area.

\* \* \* \* \*